(12) United States Patent
Park

(10) Patent No.: US 11,774,703 B2
(45) Date of Patent: Oct. 3, 2023

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventor: Tae Bong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 245 days.

(21) Appl. No.: 16/643,341

(22) PCT Filed: Aug. 20, 2018

(86) PCT No.: PCT/KR2018/009500
§ 371 (c)(1),
(2) Date: Feb. 28, 2020

(87) PCT Pub. No.: WO2019/045339
PCT Pub. Date: Mar. 7, 2019

(65) Prior Publication Data
US 2021/0063679 A1    Mar. 4, 2021

(30) Foreign Application Priority Data

Aug. 30, 2017  (KR) .......................... 10-2017-0109994
Nov. 10, 2017  (KR) .......................... 10-2017-0149252

(51) Int. Cl.
*G02B 7/09*    (2021.01)
*G02B 27/64*    (2006.01)
(Continued)

(52) U.S. Cl.
CPC ............. *G02B 7/09* (2013.01); *G02B 27/646* (2013.01); *G03B 5/00* (2013.01); *G03B 13/36* (2013.01); *G03B 2205/0007* (2013.01)

(58) Field of Classification Search
CPC . G02B 7/021; G02B 7/08; G02B 7/09; G02B 7/10; G02B 9/62; G02B 13/001;
(Continued)

(56) References Cited

U.S. PATENT DOCUMENTS

2014/0368938 A1    12/2014  Park et al.
2016/0048033 A1*   2/2016  Kim ..................... H04N 5/2254
                                                348/357

(Continued)

FOREIGN PATENT DOCUMENTS

CN    102854595 A    1/2013
CN    104902149 A    9/2015
(Continued)

*Primary Examiner* — Marin Pichler
(74) *Attorney, Agent, or Firm* — Birch, Stewart, Kolasch & Birch, LLP

(57)    ABSTRACT

An embodiment comprises: a housing; a bobbin disposed in the housing; a first coil disposed on the bobbin; a magnet disposed at the housing; an elastic part coupled to the bobbin and the housing; a circuit board disposed under the housing and comprising a pad part; a base disposed under the circuit board; a terminal disposed on the base; and a support part, one end of which is coupled to the elastic part and the other end of which is coupled to the terminal, wherein the pad part comprises: a first pad disposed beneath the circuit board; a second pad on the circuit board; and a third pad connecting the first pad and the second pad.

26 Claims, 19 Drawing Sheets

(51) Int. Cl.
*G03B 13/36* (2021.01)
*G03B 5/00* (2021.01)

(58) Field of Classification Search
CPC .............. G02B 13/0065; G02B 27/646; H04N
5/2253; H04N 5/2254; H04N 5/2257;
H04N 5/23287; G03B 2205/0007; G03B
2205/0053; G03B 2205/0069; G03B 3/02;
G03B 3/10; G03B 5/00; G03B 5/04;
G03B 13/36; G03B 30/00; H02K 11/21;
H02K 11/33; H02K 41/0354; H02K
41/0356
USPC ....... 359/911, 554, 555, 557, 811, 813, 814,
359/824, 872, 877; 396/52, 55
See application file for complete search history.

(56) References Cited

U.S. PATENT DOCUMENTS

| 2016/0209672 A1* | 7/2016 | Park | G02B 7/04 |
| 2016/0223830 A1 | 8/2016 | Oh | |
| 2016/0377881 A1 | 12/2016 | Jung et al. | |
| 2017/0146773 A1 | 5/2017 | Park | |
| 2019/0170967 A1* | 6/2019 | Jung | G03B 13/36 |

FOREIGN PATENT DOCUMENTS

| CN | 105807537 A | 7/2016 |
| CN | 106165554 A | 11/2016 |
| EP | 3045949 A1 | 7/2016 |
| EP | 3457189 A1 | 3/2019 |
| JP | 2013-210550 | 10/2013 |
| JP | 2017-523482 A | 8/2017 |
| KR | 10-2016-0000728 A | 1/2016 |
| KR | 10-2016-0004543 A | 1/2016 |
| KR | 10-2016-0008860 A | 1/2016 |
| KR | 10-2016-0030059 A | 3/2016 |
| KR | 10-2017-0024671 A | 3/2017 |
| KR | 10-2017-0060757 A | 6/2017 |
| KR | 10-2017-0086927 A | 7/2017 |
| KR | 10-2017-0092809 A | 8/2017 |
| KR | 10-2017-0110298 A | 10/2017 |
| WO | WO 2017/078392 A1 | 5/2017 |
| WO | WO 2017/196045 A1 | 11/2017 |

* cited by examiner

LENS DRIVING DEVICE, AND CAMERA MODULE AND OPTICAL DEVICE INCLUDING SAME

CROSS REFERENCE TO RELATED APPLICATIONS

This application is the National Phase of PCT/KR2018/009500 filed on Aug. 20, 2018, which claims priority under 35 U.S.C. § 119(a) to Patent Application Nos. 10-2017-0109994 and 10-2017-0149252 filed in the Republic of Korea on Aug. 30, 2017 and Nov. 10, 2017, respectively, all of which are hereby expressly incorporated by reference into the present application.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a miniature low-power camera module, and studies related thereto have been actively conducted.

In the case of a camera module configured to be mounted in a small electronic product, such as a smart phone, the camera module may frequently receive shocks when in use, and may undergo fine shaking due to, for example, the shaking of a user's hand. In consideration thereof, technology enabling a device for preventing handshake to be additionally installed to a camera module is being developed.

SUMMARY

Embodiments provide a lens moving apparatus capable of improving ease of soldering of a circuit board to terminals and preventing electrical disconnection of the terminals from the circuit board, and to a camera module and an optical device each including the same.

A lens moving apparatus according to an embodiment comprises a housing, a bobbin disposed inside the housing, a first coil disposed at the bobbin, a magnet disposed at the housing, an elastic member coupled both to the bobbin and to the housing, a circuit board disposed under the housing and including a pad portion, a base disposed under the circuit board, a terminal disposed at the base, and a support, which is coupled at one end thereof to the elastic member and at a remaining end thereof to the terminal, wherein the pad portion comprises a first pad disposed at a lower portion of the circuit board, a second pad disposed at an upper portion of the circuit board and a third pad connecting the first pad to the second pad.

The terminal may include a first coupler coupled to the remaining end of the support, a second coupler coupled to the pad portion of the circuit board, and a connector connecting a portion of one side surface of the first coupler to a portion of one side surface of the second coupler.

The circuit board may have a groove formed at a position corresponding to the second coupler of the terminal, and a portion of the third pad is disposed in the groove.

The circuit board may have a through via formed at a position corresponding to the second coupler of the terminal, and a portion of the third pad may be disposed in the through via.

The circuit board may comprise a first insulation layer, a first conductive layer disposed on an upper surface of the first insulation layer, a second conductive layer disposed on a lower surface of the first insulation layer, and a third insulation layer disposed on a lower surface of the second conductive layer, wherein the first pad is disposed on the lower surface of the second conductive layer, and the second pad is disposed on the upper surface of the first conductive layer, and wherein a lower surface of the first pad is disposed higher than a lower surface of the third insulation layer of the circuit board.

A surface area of the first pad may be larger than a surface area of the second pad.

The lens moving apparatus may further comprise solder disposed between the first pad and the second coupler.

A width of the connector may be less than a length of one side surface of the first coupler and a length of one side surface of the second coupler.

The connector may comprise a curved portion or a bent portion.

A horizontal distance between the first coupler and the second coupler may be less than a length of the second coupler in a horizontal direction, the horizontal direction being perpendicular to a width direction of the connector.

Advantageous Effects

Embodiments are able to improve ease of soldering of a circuit board to terminals and to prevent electrical disconnection of the terminals from the circuit board.

DETAILED DESCRIPTION

Figure 1:
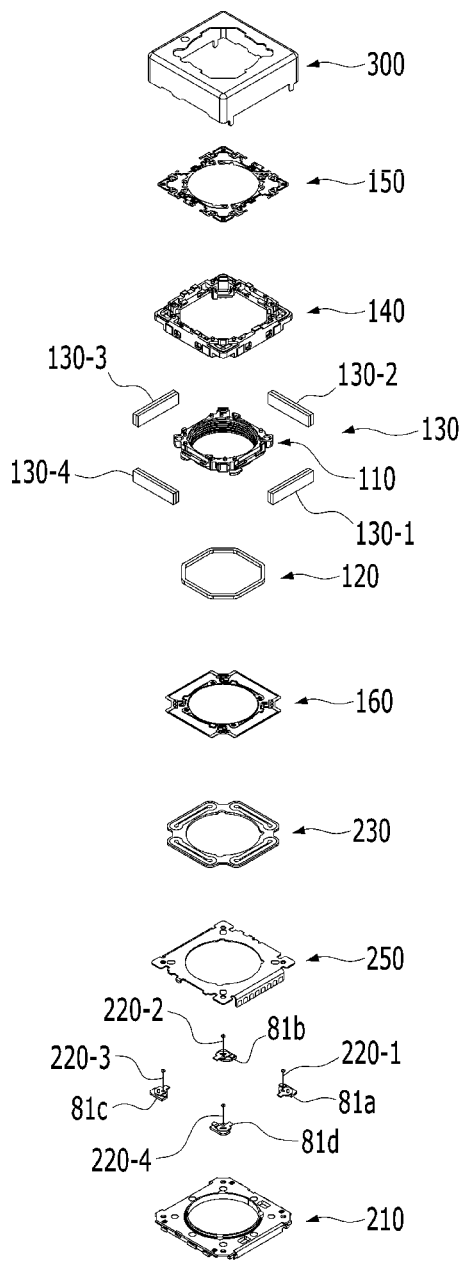
FIG. 1 is a perspective view of a lens moving apparatus according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements. The same reference numeral designates the same element throughout all the drawings.

Unless otherwise defined, the terms "comprise," "include" or "have" used in the above description are used to designate the presence of features, steps or combinations thereof described in the specification, and should be understood so as not to exclude the presence or probability of additional inclusion of one or more different features, steps or combinations thereof. Furthermore, the terms "correspond" or the like may include at least one of designations of "face" or "overlap".

For the convenience of description, although the lens moving apparatus is described using a rectangular coordinate system (x, y, z), the lens moving apparatus may be described using some other coordinate systems, and the embodiments are not limited thereto. In the respective drawings, the X-axis and the Y-axis mean directions perpendicular to an optical axis, i.e. the Z-axis, and the optical axis (Z-axis) direction or a direction parallel to the optical axis may be referred to as a "first direction", the X-axis direction may be referred to as a "second direction", and the Y-axis direction may be referred to as a "third direction".

A "handshake correction device", which is applied to a subminiature camera module of a mobile device such as, for example, a smart phone or a tablet PC, may be a device that is configured to prevent the contour line of a captured image from being indistinctly formed due to vibration caused by shaking of the user's hand when capturing a still image.

In addition, an "auto-focusing device" is a device that automatically focuses an image of a subject on an image sensor surface. The handshake correction device and the auto-focusing device may be configured in various ways, and the lens moving apparatus according to an embodiment may move an optical module, which is constituted of at least one lens, in the first direction, which is parallel to the optical axis, or relative to a plane defined by the second and third directions, which are perpendicular to the first direction, thereby performing handshake correction motion and/or auto-focusing.

Figure 2:
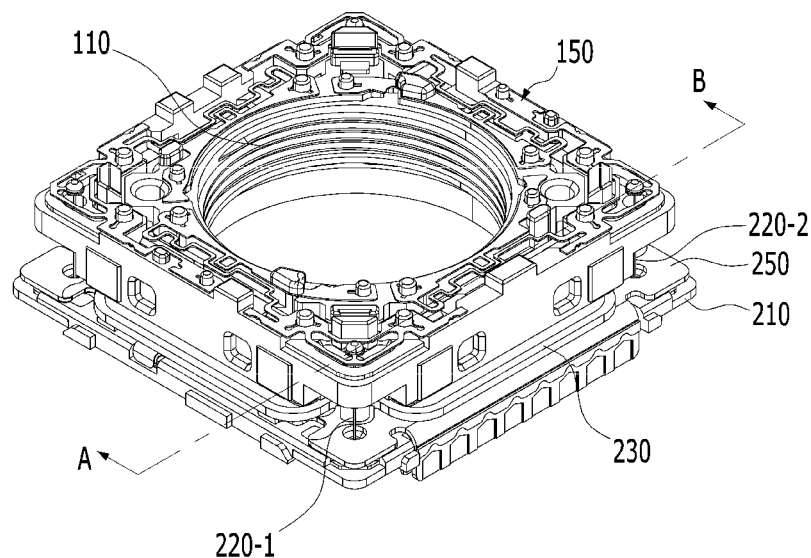
FIG. 2 is a view illustrating the assembled lens moving apparatus, from which a cover member is removed.

FIG. 1 is an exploded view of a lens moving apparatus 100 according to an embodiment. FIG. 2 is a view illustrating the assembled state of the lens moving apparatus 100, from which a cover member 300 is removed.

Referring to FIGS. 1 and 2, the lens moving apparatus 100 may include a bobbin 110, a first coil 120, magnets 130, a housing 140, a first elastic member 150 and a second elastic member 160.

The lens moving apparatus 100 may further include supports 220 and a base 210.

The lens moving apparatus 100 may further include a second coil 230 for OIS (optical image stabilization) operation, and may further include a location sensor 240 for OIS feedback operation.

The lens moving apparatus 100 may further include a cover member 300.

The cover member 300 will be described.

The cover member 300 accommodates the components 110, 120, 130, 140, 150, 160, 220 and 250, in the space defined between the cover member 300 and the base 210.

The cover member 300 may take the form of a box that has an open bottom and includes a top plate and side plates. The bottom of the cover member 300 may be coupled to the base 210. The top plate of the cover member 300 may have a polygonal shape, for example, a square or octagonal shape.

The cover member 300 may have an opening formed in the top plate thereof in order to expose a lens (not shown), coupled to the bobbin 110, to outside light. Although the material of the cover member 300 may be a non-magnetic material such as, for example, SUS in order to prevent the cover member 300 from being attracted by the magnets 130, the cover member 300 may be formed of a magnetic material, and may thus function as a yoke for increasing the electromagnetic force caused by interaction between the first coil 120 and the magnet 130.

Next, the bobbin 110 will be described.

The bobbin 110 may allow a lens or a lens barrel to be mounted thereon, and may be disposed inside the housing 140. The bobbin 110 may be configured to have an opening so as to allow a lens or a lens barrel to be mounted therein. Although the shape of the opening may be a circular shape, an elliptical shape or a polygonal shape, the disclosure is not limited thereto.

Figure 3:
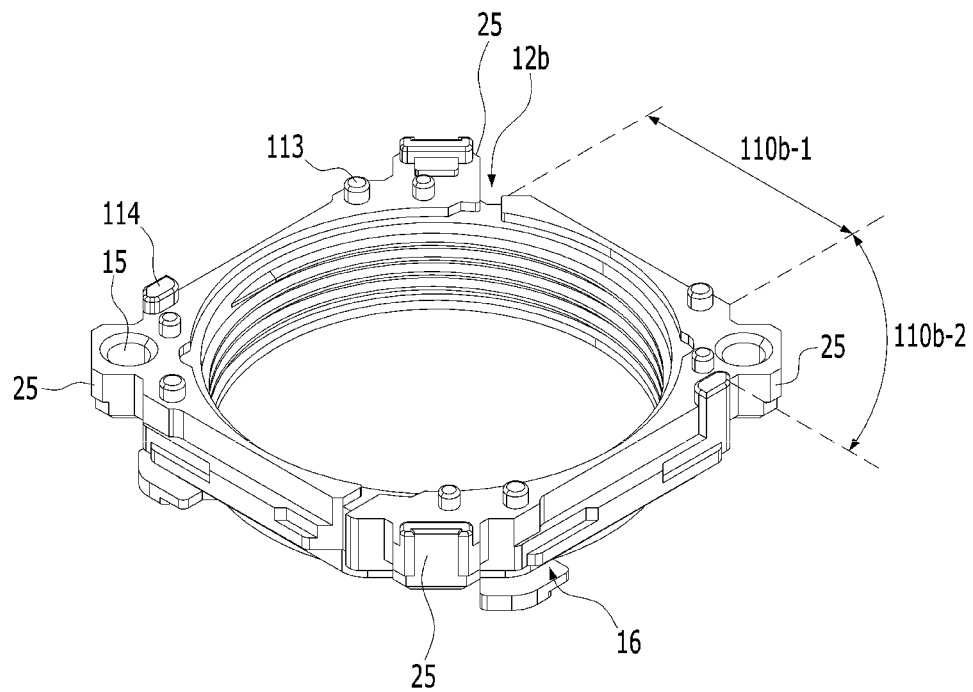
FIG. 3 is a perspective view of a bobbin.

FIG. 3 is a perspective view of the bobbin 110.

Referring to FIG. 3, the bobbin 110 may include a plurality of side portions (for example, 110b-1 and 110b-2).

For example, the bobbin 110 may include first side portions 110b-1 corresponding to the magnets and second side portions 110b-2 disposed between the first side portions.

For example, the horizontal length of the side surface of the first side portion 110b-2 of the bobbin 110 may be larger than the horizontal length of the side surface of the second side portion 110b-2. However, the disclosure is not limited thereto, and the two lengths may be the same.

The bobbin 110 may include a first stopper 114 projecting from the upper surface thereof in the first direction. The first stopper 114 of the bobbin 110 may serve to prevent the upper surface of the bobbin 110 from directly colliding with the internal surface of the top plate of the cover member 300 even if the bobbin 110 is moved beyond a specified range due to an external impact or the like when the bobbin 110 is moved in the first direction in order to perform an autofocus function.

The bobbin 110 may include at least one projection 25 projecting from the side surface (or the outer surface) of the second side portion 110b-2. For example, the bobbin 110 may include four projections 25 provided at the four side portions 110b-2, without being limited thereto. In another embodiment, the bobbin 110 may include two projections disposed at two side portions 110b-2 that face each other.

The projection 25 of the bobbin 110 may correspond to a groove 145 in the housing 140, may be inserted or disposed in the groove 145 in the housing 140, and may suppress or prevent the bobbin 110 from rotating beyond a predetermined range about the optical axis.

The bobbin 110 may include second stoppers (not shown), which project from the lower surface thereof. The second stoppers may serve to prevent the lower surface of the bobbin 110 from directly colliding with the base 210, the second coil 230 or the circuit board 250 even when the bobbin 110 is moved beyond a specified range due to an external impact or the like when the bobbin 110 is moved in the first direction in order to perform an autofocus function.

The bobbin 110 may include at least one mounting groove 16 in which the first coil 120 is disposed or mounted. For example, the mounting groove 16 may be provided at the first side portions 110b-1 and the second side portions 110b-2 of the bobbin 110, without being limited thereto.

The shape of the mounting groove 16 in the bobbin 110 and the number thereof may correspond to the shape and number of the first coil 120 disposed at the side portions of the bobbin 110.

The bobbin 110 may be provided at at least one of the first and second side portions 110b-1 and 110b-2, and may have therein a first groove 12a and a second groove 12b, which are provided at one or more of the first and second side portions 110b-1 and 110b-2 and are spaced apart from each other.

For example, the first groove 12a may be provided at one of two first side portions 110b-1 of the bobbin 110, which face each other, and the second groove 12b may be provided at the other of the two first side portions 110b-1 of the bobbin 110, which face each other.

The first groove 12a and the second groove 12b of the bobbin 110 may be positioned above or on the first coil 120 disposed at the bobbin 110, and may be connected to the mounting groove 16.

A first portion extending from one end of the first coil 120 disposed at the side portions of the bobbin 110 may be disposed in the first groove 12a, and a second portion extending from the other end of the first coil 120 disposed at the side portions of the bobbin 110 may be disposed in the second groove 12b.

The first portion of the first coil 120 may extend to the upper surface of the bobbin 110 so as to be connected to a first outer frame 151 of a first upper spring 150-1, and the second portion of the first coil 120 may extend to the upper surface of the bobbin 110 so as to be connected to a second outer frame 151 of the second upper spring 150-2.

Although the first coil 120 extends to the upper surface of the bobbin 110 so as to be conductively connected to the two upper springs in the embodiment, the disclosure is not limited thereto. In another embodiment, the first groove and the second groove may be positioned under the coil 120, and the first and second portions of the coil may extend to the lower surface of the bobbin 110 and may be conductively connected to the two lower springs.

In another embodiment, the bobbin 110 may not have the mounting groove 16 therein, and the first coil 120 may be directly wound around the side portions of the bobbin 110 and be secured thereto.

The bobbin 110 may be provided on the upper surface thereof with a first upper protrusion 113 to which a hole 151a in the first inner frame 151 is coupled.

The bobbin 110 may be provided in the lower surface thereof with a first lower protrusion (not shown), which is coupled or secured to a hole 161a in the second elastic member 160.

The bobbin 110 may be provided in the inner peripheral surface thereof with a threaded line for engagement with a lens or a lens barrel. The threaded line may be formed in the inner surface of the bobbin 110 in the state in which the bobbin 110 is held by means of a jig, and the upper surface of the bobbin 110 may have jig-holding grooves formed therein. For example, the jig-holding grooves may be provided in the upper surfaces of two projections 25 that are opposite each other, without being limited thereto.

Next, the first coil 120 will be described.

The first coil 120 may be a drive coil, which is disposed on the outer surface of the bobbin 110 so as to electromagnetically interact with the magnets 130 disposed on the housing 140.

In order to create electromagnetic force through interaction with the magnets 130, a drive signal (for example, drive current or voltage) may be applied to the first coil 120.

The drive signal applied to the first coil 120 may be a DC signal. For example, the drive signal may be of a current type or a voltage type.

Alternatively, the drive signal applied to the first coil 120 may also include a DC signal and/or an AC signal. For example, the AC signal may be a sinusoidal wave or a pulse signal (for example, a pulse width modulation (PWM) signal).

An AF operation unit may be moved in the first direction, for example, in an upward direction (in the +z-axis direction) or in a downward direction (in the −z-axis direction) by virtue of the electromagnetic force resulting from the interaction between the first coil 120 and the magnets 130. By controlling the intensity and/or polarity of a drive signal applied to the first coil 120 (for example, the direction in which current flows) and thus controlling the intensity and/or direction of the electromagnetic force resulting from the interaction between the first coil 120 and the magnets 130, it is possible to control the movement of the AF operation unit in the first direction, thereby performing an autofocus function.

The AF operation unit may include the bobbin 110, which is elastically supported by the first and second elastic members 150 and 160, and components that are mounted on the bobbin 110 and are moved therewith. For example, the AF operation unit may include the bobbin 110 and the first coil 120. In another example, the AF operation unit may further include a lens (not shown) mounted on the bobbin 110.

The first coil 120 may be disposed at the bobbin 110 so as to have a closed loop shape. For example, the first coil 120 may be wound or disposed around the outer surface of the side portions 110b-1 and 110b-2 of the bobbin 110 in a clockwise or counterclockwise direction about the optical axis.

In another embodiment, the first coil 120 may be embodied as a coil ring, which is wound or disposed in a clockwise or counterclockwise direction about an axis perpendicular to the optical axis OA. Although the number of coil rings may be equal to the number of magnets 130, the disclosure is not limited thereto.

The first coil 120 may be conductively connected to at least one of the first elastic member 150 or the second elastic member 160, and may be conductively connected to the circuit board 250 via the first elastic member 150 or the second elastic member 160 and the supports 220.

For example, the first coil 120 may be connected to the first inner frame 151 of the second and fourth upper springs 160-2 and 150-4 via a conductive adhesive member such as solder, and may be conductively connected to the circuit board 250 via second and fourth supports 220-2 and 220-4.

Next, the housing 140 will be described.

The housing 140 accommodates therein the bobbin 110, with the first coil 120 mounted or disposed thereon.

Figure 4:
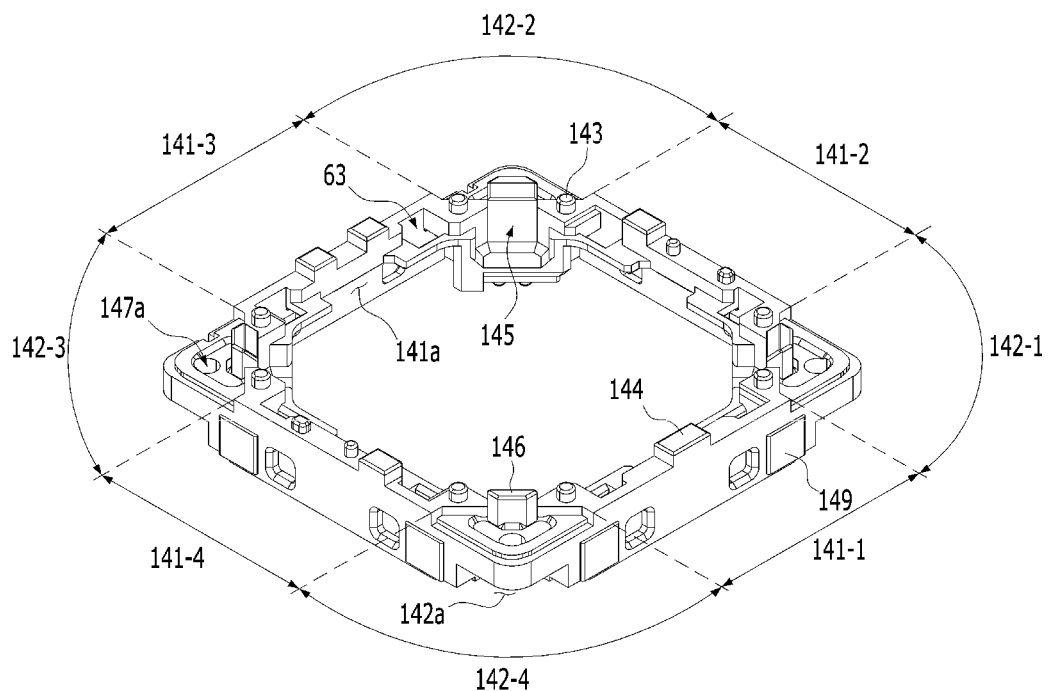
FIG. 4 is a perspective view of a housing.
Figure 5:
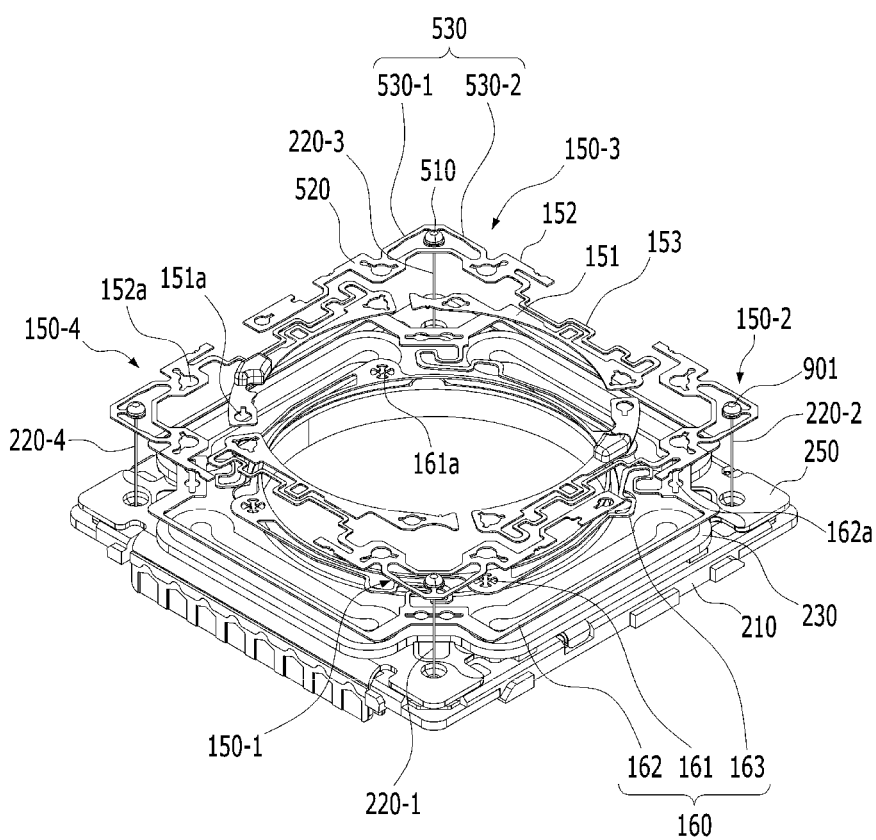
FIG. 5 is a perspective view of a first elastic member, a second elastic member, supports, a second coil, a circuit board and a base.

FIG. 4 is a perspective view of the housing 140. FIG. 5 is a perspective view illustrating the first elastic member 150, the second elastic member 150, the supports 220, the second coil 230, the circuit board 250 and the base 250.

Referring to FIGS. 4 and 5, the housing 140 may be configured to have the overall shape of a hollow cylinder, and may include a plurality of side portions, which define the hole.

For example, the housing 140 includes side portions 141-1 to 141-4, which are spaced apart from each other, and corner portions 142-1 to 142-4, which are spaced apart from each other.

For example, the housing 140 may include a first side portion 141-1, a second side portion 141-2, a third side portion 141-3, a fourth side portion 141-4, a first corner portion 142-1 positioned between the first side portion 141-1 and the second side portion 141-2, a second corner portion 142-2 positioned between the second side portion 141-2 and the third side portion 141-3, a third corner portion 142-3 positioned between the third side portion 141-3 and the fourth side portion 141-3, and a fourth corner portion 142-4 positioned between the fourth side portion 141-4 and the first side portion 141-1.

Although the side portions 141-1 to 141-4 of the housing 140 may correspond to the side portions 110b-1 of the bobbin 110 and the corner portions 142-1 to 142-4 of the housing 140 may correspond to the corner portions 110b-2 of the bobbin 110, the disclosure is not limited thereto.

The magnets 130 (130-1 to 130-4) may be disposed or mounted on at least one of the side portions 141-1 to 141-4 of the housing 140, and the supports 220; 220-1 to 220-4 may be disposed on the corner portions 142-1 to 142-4 of the housing 140.

In order to support or receive the magnets 130-1 to 130-4, the housing 140 may include mounts 141a, which are provided on the inner surfaces of the side portions 141-1 to 141-4.

The side portions 141-1 to 141-4 of the housing 140 may have formed therein grooves or holes 61, into which an adhesive for attaching the magnets 130-1 to 130-4 to the mounts 141a of the housing 140 is introduced. For example, the holes 63 may be through holes.

The side portions 141-1 to 141-4 of the housing 140 may be disposed parallel to the side plates of the cover member 300. The corner portions 142-1 to 142-4 of the housing 140 may have formed therein holes 147a through which the supports 220 extend.

Although each of the holes 147a may have a diameter that increases in a direction toward the upper surface from the lower surface of the housing 140 in order to allow a damper to be easily applied, the disclosure is not limited thereto. In another embodiment, the hole 147a may be configured such that the diameter thereof is constant.

Furthermore, the housing 140 may be provided on the upper surface thereof with stoppers 144 so as to prevent the housing 140 from directly colliding with the inner surface of the cover member 300. For example, although the second stoppers 144 may be configured to project upwards from the upper surface of at least one of the side portions 141-1 to 141-4 of the housing 140, the disclosure is not limited thereto. In another embodiment, the stopper of the housing 140 may be disposed at at least one of the corner portions.

In order to guide positioning of first outer frames 152 of the first elastic member 150 and to prevent the housing 140 from directly colliding with the inner surface of the cover member 300 when the first elastic member 150 is placed on the upper surface of the housing 140, the housing 140 may be provided on the upper surface thereof with second guide portions 146.

The housing 140 may include at least one second upper protrusion 143, which is provided on the upper surface of at least one of the corner portions 142 for coupling into holes 152a and 152b in the first outer frame 152 of the first elastic member 150.

The upper protrusions 143 may be disposed at at least one of both sides of the second guide portion 146.

The housing 140 may include at least one second lower protrusion (not shown), which is disposed on the lower surface of the side portions 141-1 to 141-4 and/or the corner portions 142-1 to 142-4 so as to be coupled or secured into holes 162a in second outer frames 162 of the second elastic member 160. Although the second lower support protrusions 145 may be disposed on the lower surface of at least one of the first to fourth corner members 501a to 501d of the housing 140, the disclosure is not limited thereto.

In order to ensure not only paths through which the supports 220 extend but also spaces that are filled with silicone for damping, the housing 140 may have recesses 142a formed in the lower portions of the corner portions 142-1 to 142-4. The recesses 142a in the housing 140 may be filled with, for example, damping silicone.

The housing 140 may have stoppers 149, which are provided on the outer surface of at least one of the side portions 141-1 to 141-4. The stoppers 149 are intended to prevent the outer surfaces of the side portions 141-1 to 141-4 of the housing 140 from directly colliding with the inner surfaces of the side plates of the cover member 300 when the housing 140 moves in the second direction and/or in the third direction.

In order to prevent the bottom surface of the housing 140 from colliding with the base 210, the second coil 230 and/or the circuit board 250, which will be described later, the housing 140 may further include a stopper (not shown) projecting from the lower surface thereof.

The housing 140 may include a groove 145, which is provided on the inner surface of the corner portions 142-1 to 142-4 so as to correspond to the projection 25 of the bobbin 110.

Next, the magnets 130 will be described.

The magnets 130 may be disposed at the side portions 141-1 to 141-4 of the housing 140 so as to overlap at at least a portion thereof the first coil 120 in a direction perpendicular to the optical axis or in the second or third direction at the initial position of the bobbin 110. The magnets 130 may be fitted or disposed in the mounts 141a of the housing 140.

Here, the initial position of the bobbin 110 may be the initial position of the AF operation unit (for example, the bobbin) in the state in which power or a drive signal is not applied to the first coil 120, and may be the position of the AF operation unit when the first elastic member 150 and the second elastic member 160 are elastically deformed by only the weight of AF operation unit.

Furthermore, the initial position of the bobbin 110 may be the position of the AF operation unit when gravity is applied toward the base 210 from the bobbin 110 or toward the bobbin 110 from the base 210.

In another embodiment, the magnets 130 may be disposed on the outer surface of the side portions 141-1 to 141-4 of the housing 140. Alternatively, the magnets 130 may also be disposed on the inner surfaces or the outer surfaces of the corner portions 142 of the housing 140.

Although each of the magnets 130 may have a shape corresponding to the shape of a corresponding one of the side portions 141-1 to 141-4 of the housing 140, that is, a rectangular shape, the disclosure is not limited thereto. The surface of the magnet 130 that faces the first coil 120 may be configured to have a curvature that corresponds to or coincides with a corresponding surface of the first coil 120.

Each of the magnets 130 may be a monopolar magnetized magnet, in which the first surface of the magnet 130, which faces the first coil 120, becomes an N pole and the opposite (second) surface of the magnet 130 becomes an S pole. However, the disclosure is not limited thereto, and the reverse configuration is also possible. In another embodiment, each of the first and second surfaces of the magnet 130 may be divided into an N pole and an S pole.

In another embodiment, each of the magnets 130 may be a bipolar magnetized magnet, which is divided into two in a direction perpendicular to the optical-axis direction. Here, the magnet 130 may be embodied by a ferrite magnet, an alnico magnet, a rare-earth magnet or the like.

For example, the magnet 130 may include a first magnet portion, a second magnet portion, and a non-magnetic partition wall. The first magnet portion and the second magnet portion may be spaced apart from each other, and the non-magnetic partition wall may be positioned between the first magnet portion and the second magnet portion.

The non-magnetic partition wall is a portion that is almost completely non-magnetic and which may include a zone having almost no polarity. The non-magnetic partition wall may be filled with air or may be made of a non-magnetic material.

Although the number of magnets 130 is four in the embodiment, the disclosure is not limited thereto, and the number of magnets 130 may be two or more. Although the first surface of the magnet 130, which faces the first coil 120, may be planar, the disclosure is not limited thereto, and the first surface may be curved.

The magnets 130 may include at least two magnets, which are disposed on the side portions of the housing 140 and which face each other.

Each of the magnets 130-1 to 130-4 may have an approximate rectangular shape. Alternatively, each of the magnets may have a triangular shape or a rhombic shape.

In another embodiment, the housing 140 may be omitted, and the magnets 130-1 to 130-4 may be disposed at the cover member 300. In a further embodiment, the housing 140 may not be omitted, and the magnets 130-1 to 130-4 may be disposed at the cover member 300.

In a further embodiment, the magnets 130-1 to 130-4 may be disposed on the inner surfaces of the side plates of the cover member 300.

Next, the first elastic member 150, the second elastic member 160 and the supports 220 will be described.

The first elastic member 150 and the second elastic member 160 may be coupled both to the bobbin 110 and to the housing 140 so as to support the bobbin 110.

The first elastic member 150 may be disposed at the upper portion or the upper surface of the bobbin 110 and may be an elastic body.

The second elastic member 160 may be disposed at the lower portion or the lower surface of the bobbin 110 and may be an elastic body.

For example, the first elastic member 150 may be coupled both to the upper portion, the upper surface or the upper end of the bobbin 110 and to the upper portion, the upper surface or the upper end of the housing 140, and the second elastic member 160 may be coupled both to the lower portion, the lower surface or the lower end of the bobbin 110 and to the lower portion, the lower surface or the lower end of the housing 140.

The supports 220 may support the housing 140 with respect to the base 210 and may conductively connect at least one of the first elastic member 150 and the second elastic member 160 to the circuit board 250.

At least one of the first elastic member 150 and the second elastic member 160 may be divided or separated into two or more.

For example, the first elastic member 150 may include first to fourth upper springs 150-1 to 150-4, which are spaced apart or separated from one another.

Although each of the first elastic member 150 and the second elastic member 160 may be embodied as a leaf spring, the disclosure is not limited thereto. Each of the first and second elastic members 150 and 160 may be embodied as a coil spring, a suspension wire or the like.

Each of the first to fourth upper springs 150-1 to 150-4 may include a first inner frame 151 coupled to the upper portion, the upper surface or the upper end of the bobbin 110, a first outer frame 152 coupled to the upper portion, the upper surface or the upper end of the housing 140, and a first frame connector 153 connecting the first inner frame 151 to the first outer frame 152.

The first inner frame 151 may have formed therein a hole 151a, to which the first upper protrusion 113 of the bobbin 110 is coupled, and the hole 151a may have at least one slit into which an adhesive member or a damper is disposed.

The first outer frame 152 of each of the first to fourth upper springs 150-1 to 150-4 may include a first coupler 510 coupled to a corresponding one of the supports 220-1 to 220-6, a second coupler 520 coupled to at least one of the corner portions 141-1 to 141-4 and/or the side portions adjacent thereto of the housing 140, and a connector 530 connecting the first coupler 510 to the second coupler 520.

The second coupler 520 may include at least one coupling region coupled to the corner portions 142-1 to 142-4 (for example, the second upper protrusion 143) of the housing 140. For example, the at least one coupling region may have therein a hole 152a.

For example, the second coupler 520 may include a first coupling region positioned at one side of the second guide portion 146 of the housing 140 and a second coupling region positioned at another side of the second guide portion 146, without being limited thereto.

Although each of the coupling regions of the second couplers 520 of the first to fourth upper springs 150-1 to 150-4 may be embodied so as to include a hole, the disclosure is not limited thereto. In another embodiment, the coupling regions may also be embodied as having various shapes suitable for being coupled to the housing 140, for example, grooves or the like.

For example, the holes 152a in the second couplers 520 may have at least one slit for allowing an adhesive member or a damper to be introduced into the gap between the second upper protrusions 143 and the holes 152a.

The first coupler 510 may have a hole through which a corresponding one of the supports 220-1 to 220-4 extends. One end of the one of the supports 220-1 to 220-2 that extends through the hole in the first coupler 510 may be coupled to the first coupler 510 using a conductive adhesive member or solder 910, and the first coupler 510 may be conductively connected to the one of the supports 220-1 to 220-4.

The first coupler 510 may be a region at which the solder 910 is disposed, and may include a hole and a region near the hole.

The connector 530 may connect the coupling region of the second coupler 520 disposed at each of the corner portions 142-1 to 142-4 to the first coupler 510.

For example, the connector 530 may include a first connector 530-1, connecting the first coupling region of the second coupler 520 of each of the first to fourth upper springs 150-1 to 150-4 to the first coupler 510, and a second connector 530-2, connecting the second coupling region of the second coupler 520 to the first coupler 510.

Although each of the connectors 530 may include a bent portion, which is bent at least once, or a curved portion, which is curved at least once, the disclosure is not limited thereto. In another embodiment, they may be linear.

The width of the connectors 530 may be smaller than the width of the second couplers 520. Accordingly, the connectors 530 may be easily movable in the first direction, making it possible to distribute the stress applied to the first elastic member 150 and the stress applied to the supports 220.

Although the couplers 530 may be bilaterally symmetrical with respect to the reference line in order to support the housing 140 in a balanced state without eccentricity, the disclosure is not limited thereto. In another embodiment, the couplers may not be bilaterally symmetrical.

For example, one end of the first coil 120 may be coupled to the first inner frame 151 of the second upper spring 151-2 and the other end of the first coil 120 may be coupled to the first inner frame 151 of the fourth upper spring 151-4 through soldering.

The second elastic member 160 may include a second inner frame 161 coupled to the lower portion, the lower surface or the lower end of the bobbin 110, a second outer frame 162 coupled to the lower portion, the lower surface or the lower end of the housing 140, and a second frame connector 163 connecting the second inner frame 161 to the second outer frame 162.

The second elastic member 160 may have therein the hole 162a, which is formed in the second inner frame 161 and which is coupled to the first lower protrusion of the bobbin 110 via a solder or a conductive adhesive member, and the hole 162a, which is formed in the second outer frame 162 and which is coupled to the second lower protrusion 147 of the housing 140.

Each of the first and second frame connectors 153 and 163 of the upper and second elastic members 150 and 160 may be bent or curved at least once so as to define a predetermined pattern. The upward and/or downward movement of the bobbin 110 in the first direction may be elastically (or flexibly) supported by virtue of positional variation and fine deformation of the first and second frame connectors 153 and 163.

In order to absorb or buffer vibrations of the bobbin 110, the lens moving apparatus 100 may further include first dampers (not shown), each of which is disposed between a corresponding one of the upper springs 150-1 to 150-4 and the housing 140.

For example, the lens moving apparatus 100 may include the first dampers (not shown), each of which is disposed in the space between the first frame connector 153 of a corresponding one of the upper springs 150-1 to 150-4 and the housing 140.

The lens moving apparatus 100 may include second dampers (not shown), each of which is disposed between a corresponding one of the second frame connectors 163 of the second elastic members 160 and the housing 140.

The lens moving apparatus 100 may further include third dampers (not shown) disposed between the supports 220 and the holes 147a in the housing 140.

Furthermore, the lens moving apparatus 100 may further include fourth dampers (not shown), which are disposed at the first couplers 510 and the first ends of the supports 220.

For example, a damper (not shown) may also be disposed between the inner surface of the housing 140 and the outer peripheral surface of the bobbin 110.

Next, the supports 220 will be described.

Each of the supports 220 may be connected at one end thereof to the elastic member 150 and at the other end thereof to a corresponding one of the terminals 81a, 81b, 81c and 81d.

The first ends of the supports 220 may be coupled to the first outer frame of the first elastic member 150 via a solder or a conductive adhesive member.

The supports 220 may include a plurality of supports. Each of the plurality of supports 220-1 to 220-6 may be coupled to a corresponding one of the first couplers 510 of the upper springs 150-1 to 150-4 via the solder 901, and may be conductively connected to the first coupler 510. For example, each of the plurality of supports 220-1 to 220-4 may be disposed on a corresponding one of the four corner portions 142-1 to 142-4.

The plurality of supports 220-1 to 220-4 may support the bobbin 110 and the housing 140 such that the bobbin 110 and the housing 140 are movable in a direction perpendicular to the first direction. Although one support is disposed at each of the corner portions 142-1 to 142-4 of the housing 140 in the embodiment shown in FIG. 5, the disclosure is not limited thereto.

In another embodiment, two or more supports may be disposed at one corner portion of the housing 140.

Each of the plurality of supports 220-1 to 220-4 may be spaced apart from the housing 140, and may be directly connected to a corresponding one of the first couplers 510 of the first outer frame 152 of each of the upper springs 150-1 to 150-4.

In another embodiment, the supports 220 may be embodied as leaf springs, and may be disposed at the side portions 141-1 to 141-4 of the housing 140.

The drive signal from the circuit board 250 may be transmitted to the first coil 120 through the plurality of supports 220-1 to 220-4 and the upper springs 150-1 to 150-4.

For example, the drive signal from the circuit board 250 may be applied to the first coil 120 via the second and fourth springs 150-2 and 150-4 and the second and fourth supports 220-2, 220-4.

The plurality of supports 220-1 to 220-4 may be additional members separated from the first elastic member 1150, and may be embodied as members having elastic supporting ability, for example, leaf springs, coil springs, suspension wires or the like. In another embodiment, the supports 220-1 to 220-4 may be integrally formed with the first elastic member 150.

Next, the base 210, the circuit board 250, the second coil 230 and the position sensor 240 will be described.

The base 210 may have an opening corresponding to the opening in the bobbin 110 and/or the opening in the housing 140, and may be configured to have a shape that coincides with or corresponds to the shape of the cover member 300, for example, a rectangular shape.

Figure 6:
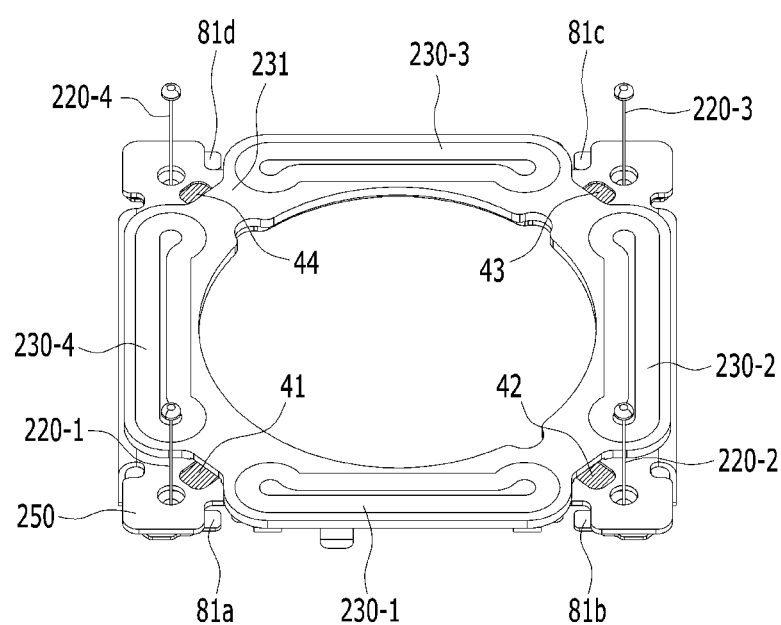
FIG. 6 is a perspective view of the second coil, the circuit board and the supports.
Figure 7:
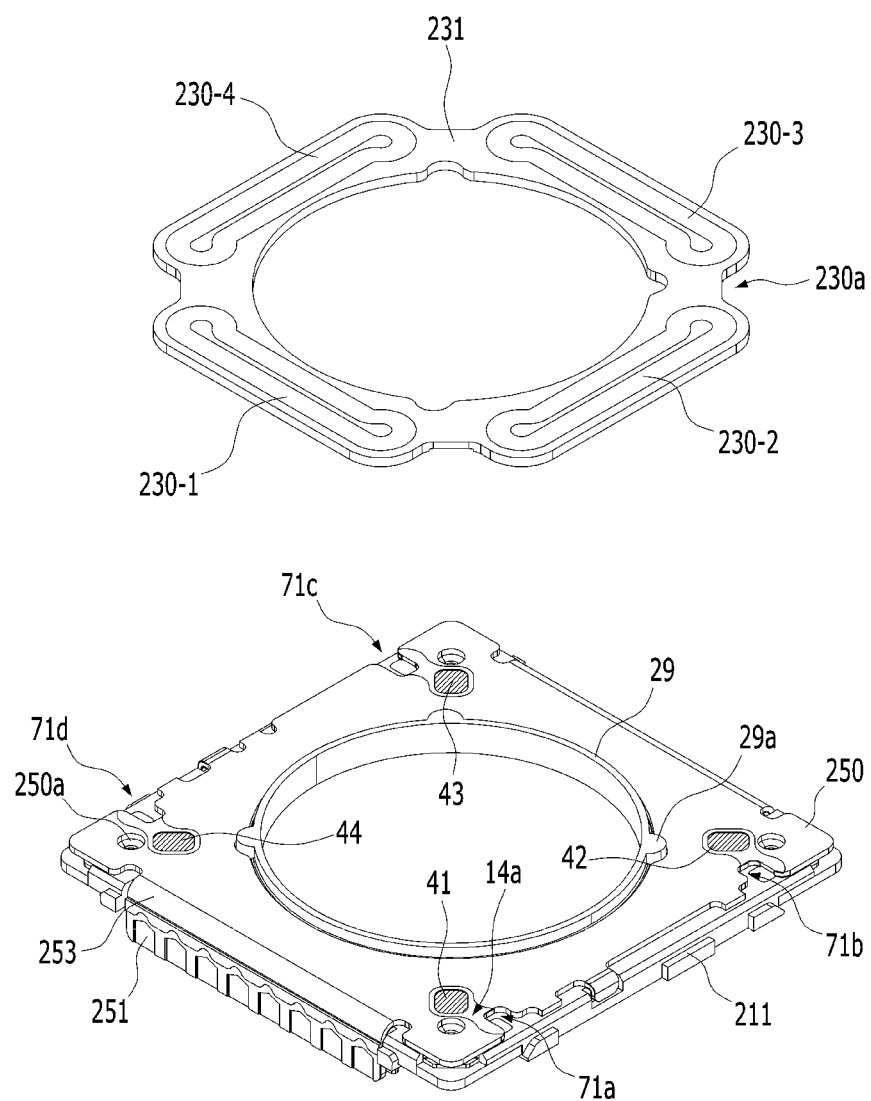
FIG. 7 is an exploded perspective view of the circuit board and the second coil, which are disposed at the base.
Figure 8:
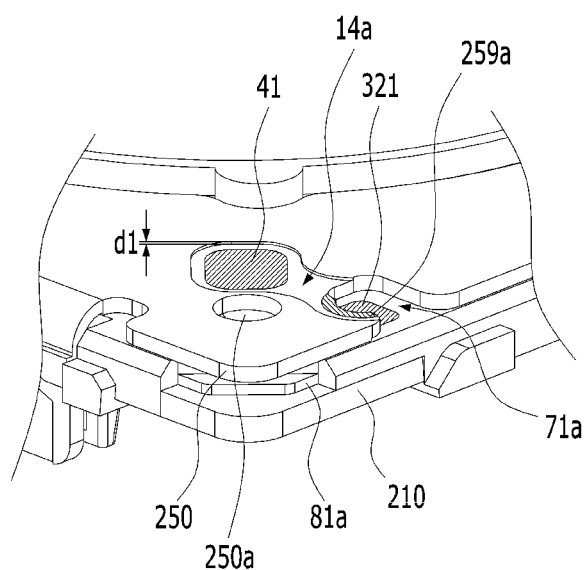
FIG. 8 is a fragmentary enlarged view of the base and the circuit board shown in FIG. 7.
Figure 9:
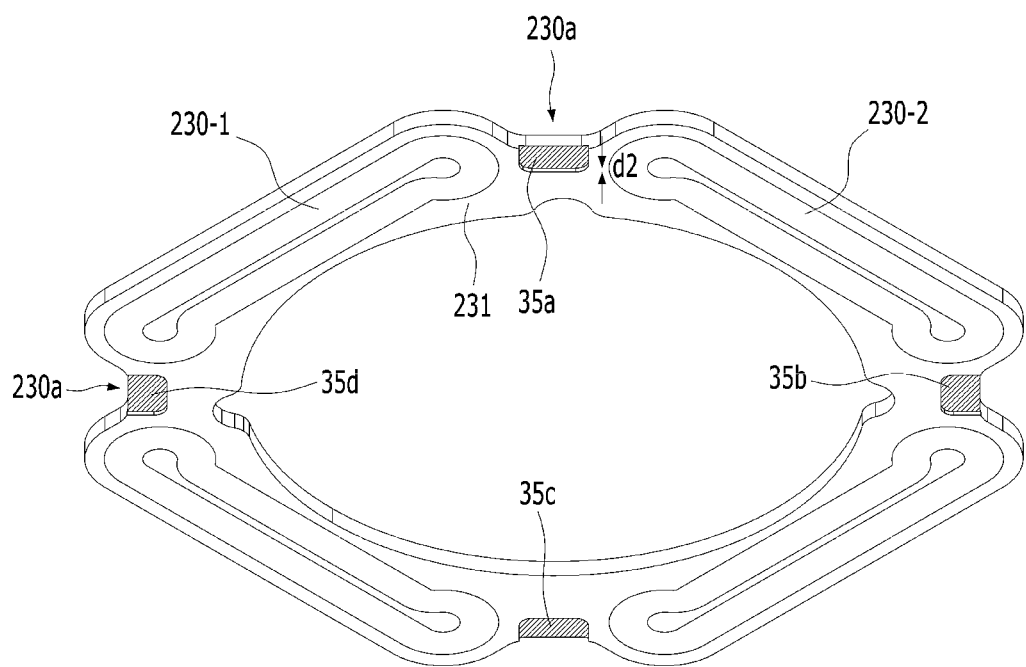
FIG. 9 is a bottom view of the circuit board including the second coil.
Figure 10A:
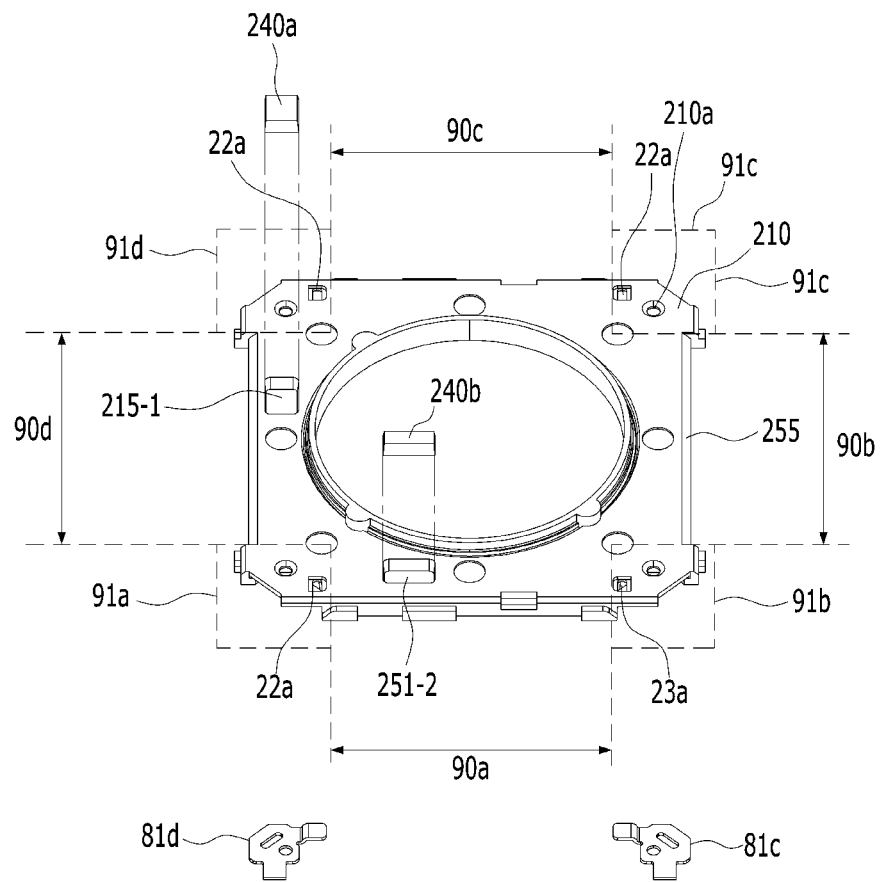
FIG. 10A is an exploded perspective view of the base, a location sensor and terminals.
Figure 10B:
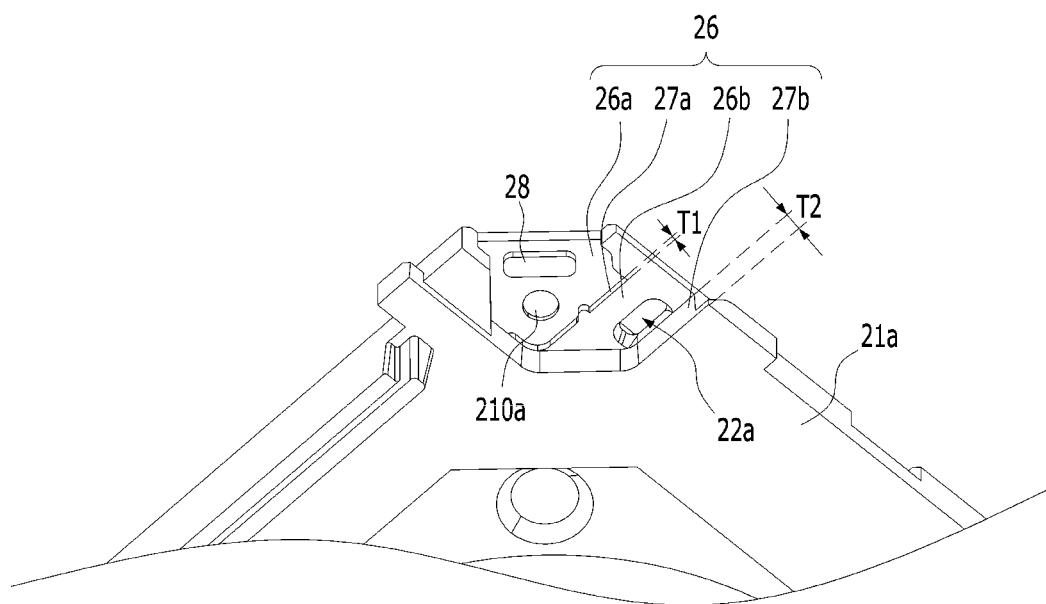
FIG. 10B is a bottom view of the base.
Figure 10C:
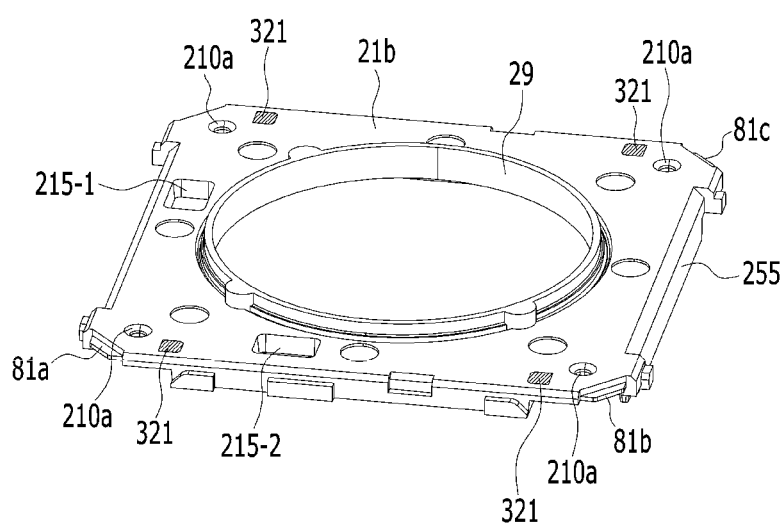
FIG. 10C is an assembled perspective view of the base and the terminals.

FIG. 6 is a perspective view of the second coil 230, the circuit board 250 and the supports 220-1 to 220-4. FIG. 7 is an exploded perspective view of the circuit board 250 and the second coil 230, which are disposed at the base 210. FIG. 8 is a fragmentary enlarged view of the base 210 and the circuit board 250 shown in FIG. 7. FIG. 9 is a bottom view of the circuit member including the second coil 230. FIG. 10A is an exploded perspective view of the base 210, the location sensor 240 and the terminals 81a to 81d. FIG. 10B is a bottom view of the base 210. FIG. 10C is an assembled perspective view of the base 210 and the terminals 81a to 81d.

Referring to FIGS. 6 to 10c, the base 210 may include a step 211, to which an adhesive is applied when the cover member 300 is adhesively attached to the base 210. The step 211 may guide the cover member 300, which is coupled to the upper side thereof, and may face the lower ends of the side plates of the cover member 300.

The base 210 may be disposed under the bobbin 110 and the housing 140, and may include a support groove or a support portion 255 (see FIG. 10A), which is formed on the side surface thereof that faces the portion including the terminals 251 of the circuit board 250. The support portion 255 of the base 210 may support the terminal member 253 of the circuit board 250.

The base 210 may be provided in the upper surface thereof with mounting grooves 215-1 and 215-2, in which the position sensors 240 mounted on the circuit board 250 are disposed or mounted. According to the embodiment, the base 210 may be provided with two mounting grooves 215-1 and 215-2.

The second coil 230 may be disposed above the circuit board 250, and the base 210 may be disposed under the circuit board 250.

For example, the position sensor 240 may be mounted on the lower surface of the circuit board 250, and the lower surface of the circuit board 250 may face the upper surface of the base 210.

The circuit board 250 may be positioned under the housing 140, may be disposed on the upper surface of the base 210, and may have an opening that corresponds to the opening in the bobbin 110, the opening in the housing 140 and/or the opening in the base 210.

The outer peripheral surface of the circuit board 250 may have a shape that coincides with or corresponds to the upper surface of the base 210, for example, a square shape.

The circuit board 250 may include at least one terminal portion, which is bent from the upper surface of the circuit board 250 and which includes a plurality of terminals 251 or pins for conductive connection to external components.

The terminal portion 253 of the circuit board 250 may include the plurality of terminals 251. For example, a drive signal for driving the first coil 120, the second coil 230 and the location sensor 240 may be received through the plurality of terminals 251 provided at the terminal portion 253 of the circuit board 250.

According to the embodiment, the circuit board 250 may be an FPCB without being limited thereto.

The circuit board 250 may have holes 250a, through which the supports 220-1 to 220-4 extend. The holes 250a may be disposed adjacent to the corners of the circuit board 250.

The positions and the number of holes 250a may correspond to or coincide with the positions and the number of supports 220-1 to 220-4.

Each of the supports 220-1 to 220-4 may extend through a corresponding one of the holes 250a in the circuit board 250 and may be disposed so as to be spaced apart from the inner surface of the hole 250a. Although FIG. 7 illustrates the holes 250a through which the supports 220-1 to 220-4 extend, the disclosure is not limited thereto. In another embodiment, the circuit board 250 may have openings, escape grooves or the like, each of which has a shape that allows the supports 220-1 to 220-4 to extend therethrough.

The second coil 230 may be positioned under the housing 140, and may be disposed at the upper portion of the circuit board 250 so as to correspond to the magnets 130 disposed at the housing 140.

For example, the second coil 230 may include four OIS coils 230-1 to 230-4 disposed at the four sides of the circuit board 250 without being limited thereto. The second coil 230 may also include only two coils, for example, one coil for the second direction and one coil for the third direction, or may include four or more coils.

Although FIG. 7 illustrates the second coil 230 provided at an additional circuit member 231 separate from the circuit board 250, the disclosure is not limited thereto. In another embodiment, the second coil 230 may be embodied as a circuit pattern formed at the circuit board 250.

In another embodiment, the circuit member 231 may be omitted, and the second coil 230 may be embodied as a ring-shaped coil block or an FP coil separate from the circuit board 250.

Although the circuit board 250 and the circuit member 231 are described as being separate components, the disclosure is not limited thereto. In another embodiment, a configuration including at least one of the circuit board 250, the circuit member 231 and the second coil 230 may be represented as the term "circuit member".

The circuit member 231, at which the second coil 230 is provide, may have escape grooves 230a formed in the corners thereof. The escape grooves 230a may have shapes such that the corners of the circuit member 231 are chamfered. In another embodiment, the corner portions of the circuit member 231 may have holes through which the supports 220 extend.

As described above, the housing 140 may be moved in the second direction and/or the third direction by the interaction between the magnets 130 and the second coil 230, which correspond to each other, thereby performing handshake correction.

The position sensor 240 may detect the intensity of the magnetic field of the magnets 130 disposed on the housing 140 when the housing 140 is moved in a direction perpendicular to the optical-axis direction, and may output an output signal (for example, an output voltage) according to the result of the detection.

Based on the output signal from the position sensor 240, it is possible to detect displacement of the housing 140 relative to the base 210 in a direction (for example, in the X-axis direction or in the Y-axis direction) perpendicular to the optical axis (for example, in the Z-axis direction).

The position sensor 240 may include two OIS position sensors 240a and 240b for detecting displacement of the housing 140 in the second direction (for example, in the X-axis direction) and in the third direction (for example, in the Y-axis direction) perpendicular to the optical axis.

The OIS position sensor 240a may detect the intensity of the magnetic field of the magnet 130 when the housing 140 is moved, and may output a first output signal according to the result of the detection. The OIS position sensor 240b may detect the intensity of the magnetic field of the magnet 130 when the housing 140 is moved, and may output a second output signal according to the result of the detection. The controller 830 of the camera module or the controller 780 of the portable terminal 200A may detect the displacement of the housing 140 based on the first and second output signals, and may perform OIS feedback operation based on the detected displacement of the housing 140.

Each of the OIS position sensors 240a and 240b may be embodied as a hall sensor. Any sensor may be used, as long as the sensor is capable of detecting the intensity of a magnetic field. For example, each of the OIS position sensors 240 may be embodied as a driver including a hall sensor, or may be embodied as a position detection sensor, such as a hall sensor, alone.

Each of the OIS position sensors 240a and 240b may be mounted on the circuit board 250, and the circuit board 250 may include terminals conductively connected to the OIS position sensors 240a and 240b.

The opening in the base 210 may be provided therearound with a projection 29, and the projection 29 may be fitted into the opening in the circuit board 250 and the opening in the circuit member 231.

The projection 29 of the base 210 may be provided at the side surface thereof with protrusions 29a (see FIG. 12), which project in a direction perpendicular to the optical axis, and the opening in the circuit board 250 may have grooves 250b (see FIG. 13) corresponding to the protrusions 29a. The protrusions 29a of the base 210 may be inserted into the grooves 250b in the circuit board 250. By virtue of the coupling between the protrusions 29a of the base 210 and the grooves 250b in the circuit board 250, it is possible to suppress rotation or movement of the circuit board 250 on the upper surface of the base 210.

Referring to FIG. 7, the circuit board 250 may include a plurality of pads 41 to 44 disposed on the upper surface thereof. Here, the term "pad portion" in the pad portions of the circuit board 250 may be used interchangeably with "bonding portion", "electrode portion", "lead portion" or "terminal portion".

For example, each of the plurality of pad portions 41 to 44 may be positioned adjacent to a corresponding one of the holes 250a in the circuit board 250.

Each of the plurality of pad portions 41 to 44 may be positioned lower than the upper surface of the circuit board 250. For example, a depth d1 in the optical-axis direction may be present between the upper surfaces of the plurality of pad portions 41 to 44 and the upper surface of the circuit board 250. For example, the depth d1 may be 35 mm~40 mm. For example, the depth d1 may be 37.5 mm.

The circuit board 250 may include exposed regions 14a through which the plurality of pads 41 to 44 are exposed. The upper surfaces of the exposed regions 14a may be positioned in the same plane as the upper surface of the pad portion (for example, 41).

For example, the upper surfaces of the exposed regions 14a may be positioned lower than the upper surface of the circuit board 250, and a depth in the optical-axis direction may be present the upper surfaces of the exposed regions 14a and the upper surface of the circuit board 250.

The exposed regions 14a of the circuit board 250 may abut grooves 71a to 71d in the circuit board 250, and may be exposed or may open through the side surfaces or the grooves 71a to 71d in the circuit board 250. Since the exposed regions 14a are exposed or opens through the side surfaces of the circuit board 250, solder may easily enter the pad portions 41 to 44 of the circuit board 250 through the exposed regions 14a, thereby improving ease of soldering.

The circuit board 250 may have the plurality of grooves 71a to 71d formed in the side surface thereof. The grooves 71a to 71d in the circuit board 250 may be intended to expose portions of the terminals 81a to 81d mounted on the base 210, for example, portions (or exposed regions) 321 of the second couplers 320 (see FIG. 11).

Although each of the grooves 71a to 71d may take the form of a via hole or a recess formed in the side surface of the circuit board 250, the disclosure is not limited thereto. In another embodiment, the groove may have the form of a through hole or a through via hole. Here, the through hole or the through via hole may be spaced apart from the side surface of the circuit board 250.

Referring to FIG. 9, the circuit member 231 may include a plurality of pad portions 35a to 35d disposed on the lower surface thereof so as to correspond to the plurality of the pad portions 41 to 44 of the circuit board 250. The term "pad portion" used to refer to the pad portions 35a to 35 of the circuit board 231 may be used interchangeably with "bonding portion", "electrode portion", "lead portion" or "terminal portion".

Each of the pad portions 35a to 35d of the circuit board 231 may be positioned so as to abut or to be adjacent to a corresponding one of the escape grooves 230a in the circuit board 231.

Each of the pad portions 35a to 25d of the circuit board 231 may be positioned higher than the lower surface of the circuit board 231. For example, a depth d2 in the optical-axis direction may be present between the lower surfaces of the plurality of pad portions 35a to 35d and the lower surface of the circuit member 231. For example, the depth d2 may be 35 mm~40 mm. For example, the depth d2 may be 37.5 mm.

A portion of each of the pad portions 35a to 35d of the circuit board may overlap a corresponding one of the plurality of pad portions 41 to 44 in the optical-axis direction. Another portion of each of the pad portions 41 to 44 of the circuit board 250 that does not overlap a corresponding one of the pad portions 35a to 35d of the circuit board 231 in the optical-axis direction may be exposed from the circuit board 231 through the escape groove 230a. The reason for this is to couple the pad portions 41 to 44 to the pad portions 35a to 35d using solder.

By virtue of the depth d1 between the upper surfaces of the pad portions 41 to 44 of the circuit board 250 and the upper surface of the circuit board 250 and the depth d2 between the lower surfaces of the pad portions 35a to 35d of the circuit board 231 and the lower surface of the circuit board 231, the distance or the space between the pad portions 41 to 44 of the circuit board 250 and the pad portions 35a to 35d of the circuit board 231 may be increased.

Consequently, solder may easily enter a space between the pad portions 41 to 44 of the circuit board 250 and the pad portions 35a to 35d of the circuit board 231 and solderability may be improved when soldering the pad portions 41 to 44 of the circuit board 250 to the pad portions 35a to 35d of the circuit board 231.

Referring to FIG. 10A, the base 210 may include side portions 90a to 90d and corner portions 91a to 91d.

For example, the base 210 may include a first side portion 90a, a second side portion 90b, a third side portion 90c, a fourth side portion 90d, a first corner portion 91a between the first side portion 90a and the second side portion 90b, a second corner portion 91b between the second side portion 90b and the third side portion 90c, a third corner portion 91c between the third side portion 90c and the fourth side portion 90d, and a fourth corner portions 91d between the fourth side portion 90d and the first side portion 90a.

The side portions 90a to 90d of the base 210 may correspond to or overlap the side portions 141-1 to 141-4 of the housing in the optical-axis direction, and the corner portions 91a to 91d of the base 210 may correspond to or overlap the corner portions 142-1 to 142-4 of the housing 140 in the optical-axis direction.

The corner portions 91a to 91d of the base 210 may have formed therein holes 210a, through which the supports 220-1 to 220-1 extend.

For example, each of the corner portions 91a to 91d of the base 210 may have formed therein the hole 210a, through which a corresponding one of the supports 220-1 to 220-4 extends. For example, the holes 210a may be through holes, which are respectively formed through the corner portion 91a to 91d.

Each of the corner portions 91a to 91d of the base 210 may be provided with a stepped portion 26, in which a corresponding one of the terminals 81a to 81d is mounted or inserted. The stepped portion 26 may have a form that is depressed from the lower surface of the base 210, and may be referred to as a "groove portion".

The stepped portions 26 of the base 210 may be provided at the lower portions, the lower ends or the lower surfaces of the corner portions 91a to 91d of the base 210, and at least one depth may be formed from the lower surface of the base 210 in a direction toward the upper surface 21b of the base from the lower surface 21a of the base 210.

The stepped portion 26 of the base 210 may have a hole 210a, through which the support extends, and a hole 22a, through which a portion of each of the terminals 91a to 91d is exposed through the upper surface 21b of the base 210.

For example, the stepped portion 26 of the base 210 may include a first surface 26a, a second surface 26b, a first side surface 27a and a second side surface 27b.

For example, the first surface 26a of the stepped portion 26 may have a first depth T1 from the lower surface of the base 210 in a direction toward the upper surface 21b from the lower surface 21a of the base 21, and may be parallel to the lower surface 26a of the base 210.

For example, the second surface 26b of the stepped portion 26 may have a second depth T2 from the lower surface of the base 210 in a direction toward the upper surface 21b from the lower surface 21a of the base 210, and may be parallel to the lower surface 26a of the base 210.

For example, the second depth T2 may be smaller than the first depth T1 (T2<T1), and the second surface 26b of the stepped portion 26 may be positioned between the first surface 26a and the lower surface 26a of the base 210.

The first side surface 27a of the stepped portion 26 may connect the first surface 26a of the stepped portion 26 to the second surface 26b of the stepped portion 26 and may be a sloping surface, which is inclined at a predetermined angle (for example, a right angle) with respect to the first surface 26a.

The second side surface 27b of the stepped portion 26 may connect the lower surface 26a of the base 210 to the second surface 26b of the stepped portion 26, and may be a sloping surface, which is inclined at a predetermined angle (for example, a right angle) with respect to the second surface 26b.

For example, the second surface 26b and the second side surface 27b of the stepped portion 26 may define a single groove, and the first surface 26a and the first side surface 27a of the stepped portion 26 may define another groove.

The hole 210a in the base 210 may be disposed or positioned at the first surface 26a of the stepped portion 26.

The first surface 26a of the base 210 may be provided with a protrusion 28, which is coupled to a hole 311 in each of the terminals 81a to 81d. The protrusion 28 may project from the first surface 26a of the base 210 in a direction toward the lower surface 21a from the upper surface 21b of the base 210.

By virtue of the coupling between the protrusions 28 of the base 210 and the holes 311 in the terminals 81a to 91d, it is possible to increase the binding force between the terminals 81a to 81d and the base 210.

The base 210 may have a hole 22a, which is disposed or positioned at the second surface 26b of the stepped portion 26. The hole 22a may be formed through the upper surface 21b of the base 210 and the second surface 26b of the stepped portion 26, and a portion of each of the terminals 81a to 81d may be exposed or may open from the upper surface 21b of the base 210 through the hole 22a.

Next, the terminals 81a to 81d will be described.

The terminals 81a to 81d may be disposed or mounted on the lower portion, the lower end or the lower surface of the base 210. Although the number of terminals may be equal to the number of supports, the disclosure is not limited thereto. The terminals 81a to 81d may be referred to as "terminal members" or "terminal units".

For example, the embodiment may include the first to fourth terminals 81a to 81d corresponding to the first to fourth supports 220-1 to 220-4.

For example, the first to fourth terminals 81a to 81d may be disposed at the four corners or the four corner portions of the base 210.

Figure 11:
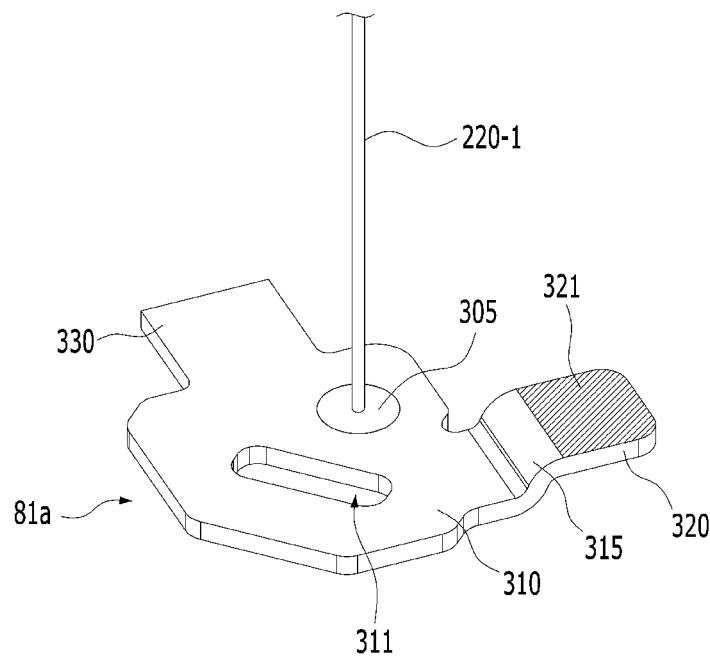
FIG. 11 is a perspective view of the first terminal and the first support.

FIG. 11 illustrates a perspective view of the first terminal 81a and the first support 220-1.

The description regarding the first terminal 81a shown in FIG. 11 may be equally applied to the remaining terminals, that is, second and third terminals.

Referring to FIG. 11, the first terminal 81a may include a first coupler 310 and a second coupler 320. The first coupler 310 may be referred to as a "first connector" or a "first portion", and the second coupler 320 may be referred to as a "second connector" or a "second portion".

The second coupler 320 may be disposed between the base 210 and the circuit board 250k, and the first coupler 310 may be disposed lower than the second coupler 320.

For example, the second coupler 320 may be positioned lower than or at the same height as the upper surface of the base 210.

The upper surface of the second coupler 320 may be exposed from the upper surface of the base 210, and the lower surface of the first coupler 310 may be exposed from the lower surface of the base 210.

The surface area of the first coupler 310 (for example, the surface area of the upper surface thereof) may be larger than the surface area of the second coupler 320 (for example, the surface area of the upper surface thereof).

For example, the length of the first coupler 310 in a direction toward the second corner portion 91b from the first corner portion 91a of the base 210 may be greater than the length of the second coupler in a direction toward the second corner portion 91b from the first corner portion 91a.

Figure 20:
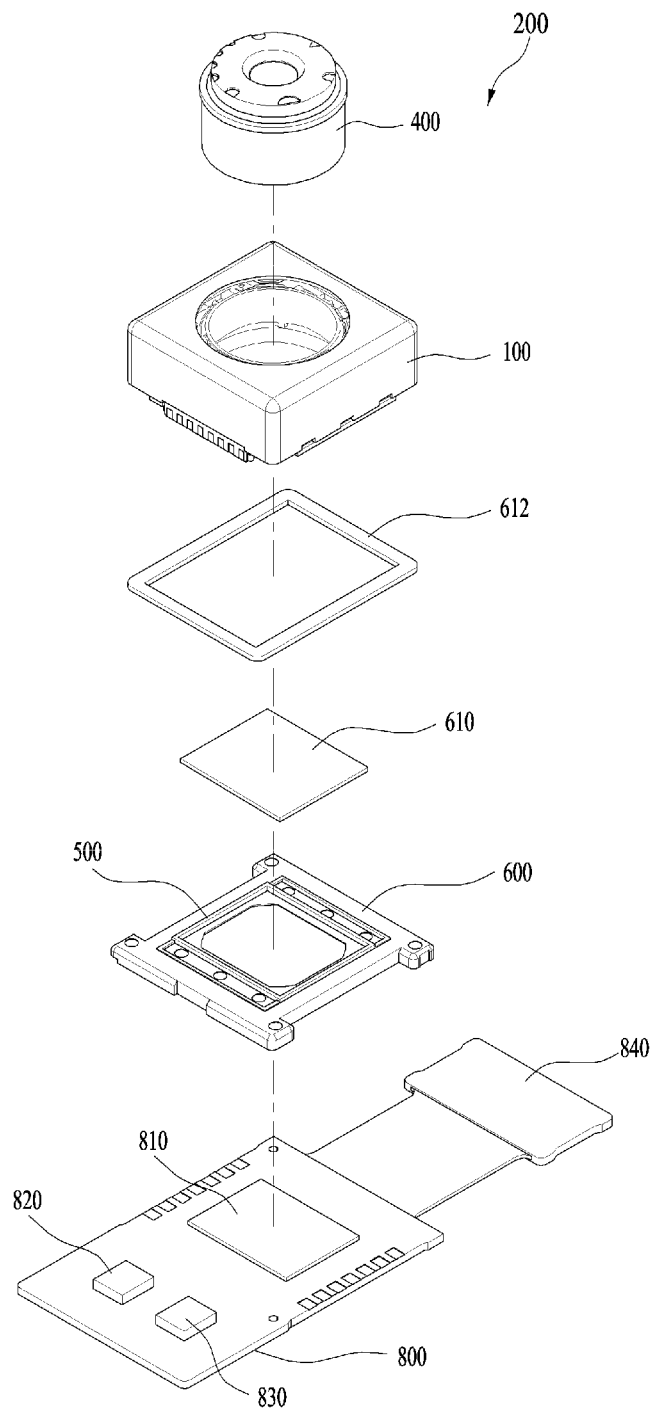
FIG. 20 is an exploded perspective view of a camera module according to an embodiment.

The first coupler 310 may be positioned lower than the lower surface of the base 210 and may be positioned higher than a first holder 600 and a second holder 800 of a camera module 200 (see FIG. 20).

The first terminal 81a may include a connector 315 connecting the first coupler 310 to the second coupler 320. The connector 315 may be referred to as a "third connector" or a "third portion".

The connector 315 may be bent or curved from the first coupler 310. Although the connector 315 may be integrally formed with the first coupler 310 and the second coupler 320, the disclosure is not limited thereto. In another embodiment, the connector may be assembled with the base 210 separately from the first coupler 310 and the second coupler 320 and may be disposed at the side surface of the base 210.

The first coupler 310 may have a hole 305, through which the support (for example, 220-1) extends, and a hole 311, which is coupled to the protrusion 28 of the stepped portion 26 of the base 210.

The hole 305 in the first coupler 310 may be a through hole. The hole 305 in the first coupler 310 may correspond to the hole 210a in the base 210 and may overlap the hole 210a in the base 210 in the optical-axis direction or in a direction toward the upper surface 21b from the lower surface 21a of the base 210.

One end of the support (for example, 220-1) may be coupled to the first coupler 510 of the first outer frame 151 of the upper spring (for example, 150-1).

Figure 14:
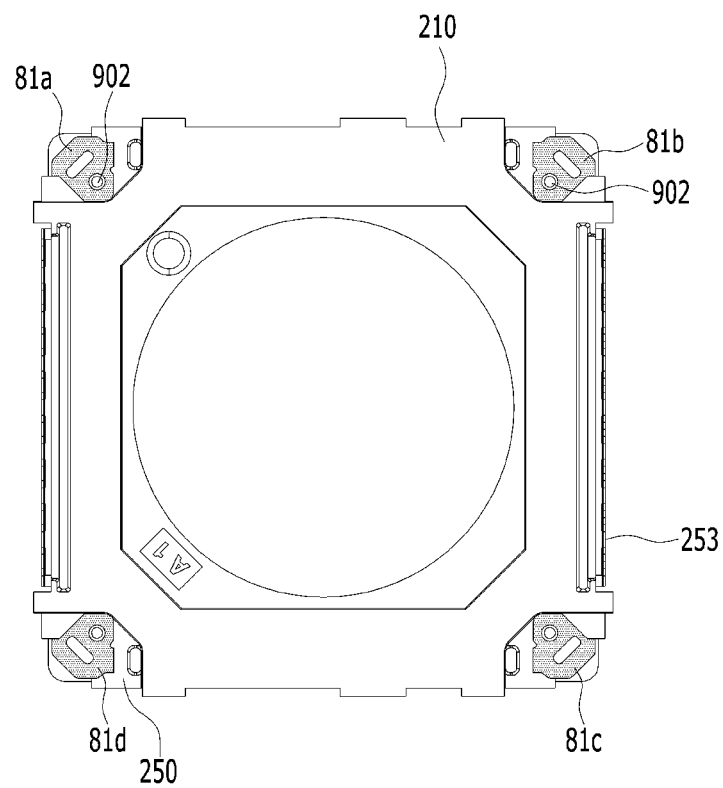
FIG. 14 illustrates solders for coupling the terminals to the supports.

The other end (for example, 81a) of the support (for example, 220-1) may extend through the hole 305 in the terminal (for example, 81a) and may be coupled to the lower surface of the first coupler 310 using solder 902 (see FIG. 14).

For example, the lens moving apparatus 100 may further include the solder 902 coupling the other end of the support (for example, 220-1), passing through the hole 305, to the lower surface of the first coupler 310.

The hole 311 in the first coupler 310 may be coupled to the protrusion 28 of the base 210 so as not only to increase the binding force between the base 210 and the terminals 81a to 81d but also to improve the solderability between the first coupler 310 and the supports.

Because heat generated during soldering is efficiently transmitted to the outside of the first coupler 310 as the surface area of the first coupler 310 increase, there may be poor soldering between the support (for example, 220-1) and the hole 305 in the first coupler 310. The hole 311 in the first coupler 310 may suppress the transmission of heat during soldering and may thus improve solderability between the support (for example, 220-1) and the hole 305 in the first coupler 310.

The first coupler 310 may be disposed or positioned under the first surface 26a of the stepped portion 26 of the base 210.

The second coupler 320 may be connected to one end of the first coupler 310, and may be disposed or positioned under the second surface of the stepped portion 26 of the base 210.

A portion 321 of the second coupler 320 may be exposed from the upper surface 21b of the base 210 through the hole 22a in the stepped portion 26. Hereinafter, the portion 321 of the second coupler 320 is referred to as an exposed region 321 of the second coupler 320.

The first terminal 81a may further include an extension 330 extending from the other end of the first coupler 310.

The extension 330 may be parallel to the first coupler 310, may be positioned in the same plane as the first coupler 310, and may be inserted into the base 210.

The extension 330 is capable of increasing the binding force between the first terminal 81a and the base 210.

For example, the first coupler 310, the second coupler 320 and the extension 330 may be integrally formed with one another. For example, there may be a structure in which the terminals 81a to 81d may be inserted into the base 210 through insert injection molding.

For example, the terminals 81a to 81d may be formed in conjunction with the base 210 through insert injection molding, and at least a portion of each of the first coupler 310 and the second coupler 320 may be inserted or disposed in the base 210.

For example, the terminals 81a to 81d may be formed in conjunction with the base 210 through insert injection molding, and the connector 315 may be disposed in the base.

In another embodiment, the terminals may be attached or coupled to the lower surface or the upper surface of the base 210 rather than through insert injection molding.

Figure 12:
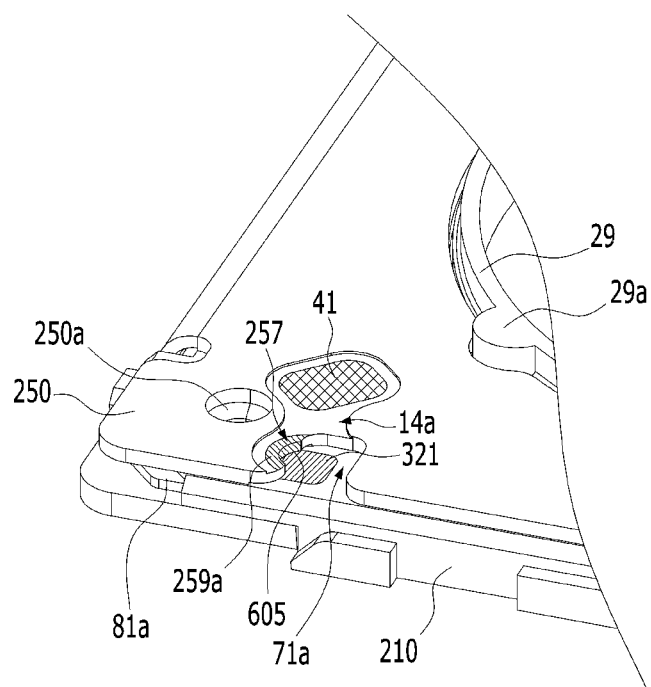
FIG. 12 is a fragmentary assembled perspective view of the base, the first terminal and the circuit board, which are coupled to one another.
Figure 13:
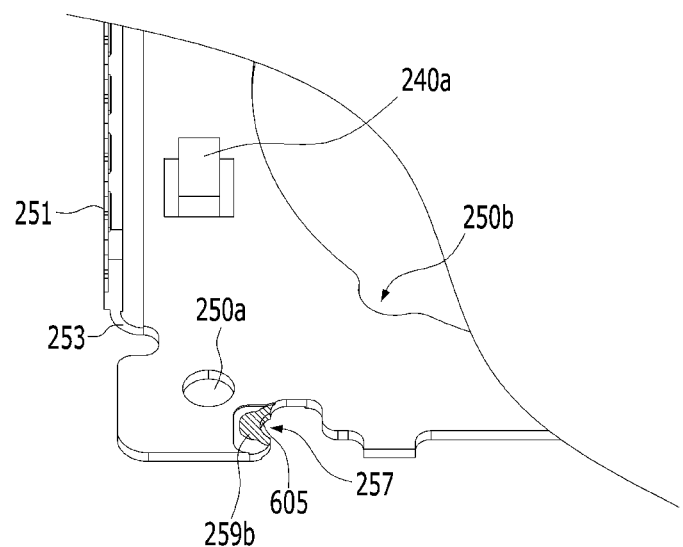
FIG. 13 is a bottom view of the circuit board.
Figure 15:
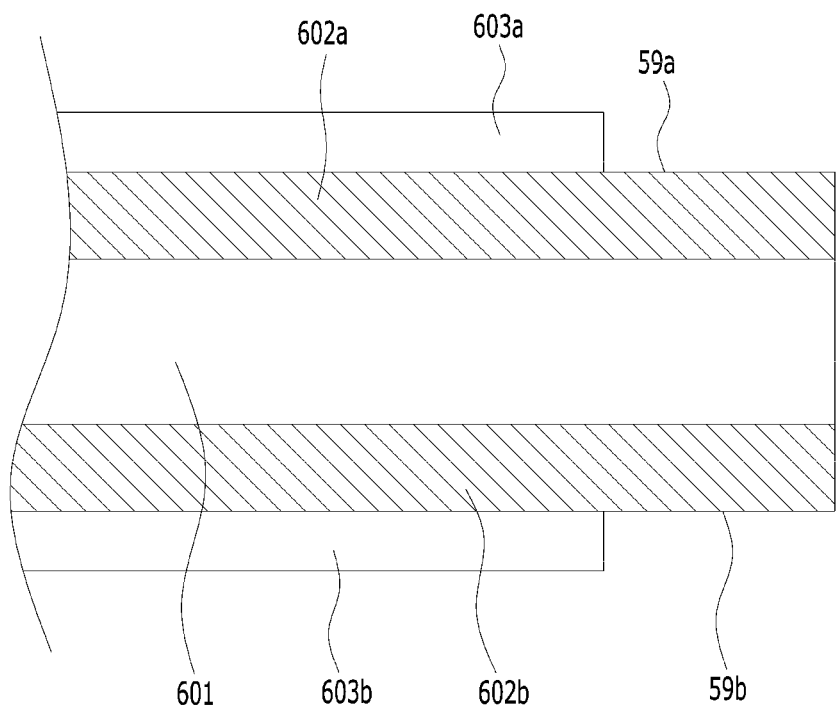
FIG. 15 is a cross-sectional view of a pad portion of the circuit board.
Figure 16:
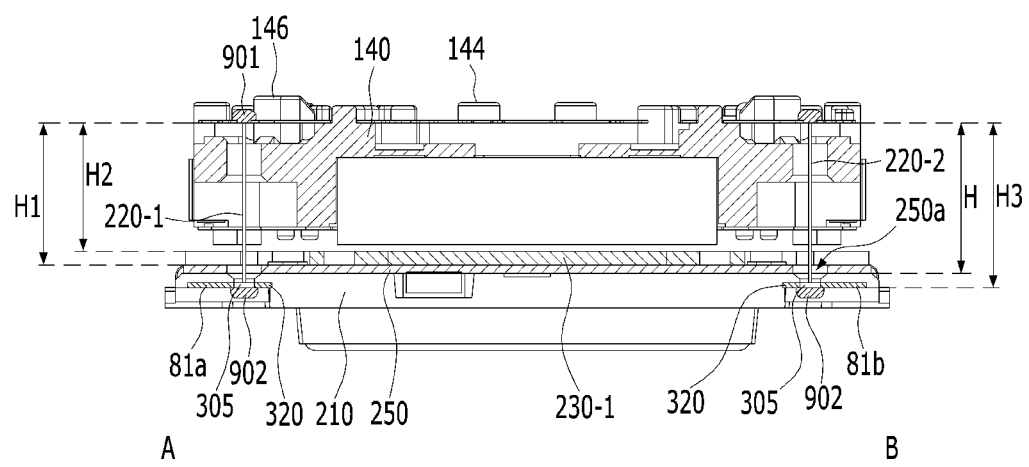
FIG. 16 is a cross-sectional view of the lens moving apparatus shown in FIG. 2, taken along line A-B.

FIG. 12 is a fragmentary perspective view of the base 210, the first terminal 81a and the circuit board 250, which are assembled with one another. FIG. 13 is a bottom view of the circuit board 250. FIG. 14 illustrates solders 902 for coupling the terminals 81a to 81d to the supports 220-1 to 220-4. FIG. 15 is a cross-sectional view of a pad portion 257 of the circuit board 250. FIG. 16 is a cross-sectional view of the lens moving apparatus 100 shown in FIG. 2, taken along line A-B.

Referring to FIGS. 12 to 16, the circuit board 250 may be disposed on the upper surface of the base 210, and each of the grooves 71a to 71d in the circuit board 250 may expose a corresponding one of the second couplers 320 of the terminals 81a to 81d exposed from the upper surface 21b of the base 210.

As illustrated in FIGS. 6 and 7, each of the grooves 230a in the circuit board 231 may expose the upper surface of a corresponding one of the second couplers 320 of the terminals 81a to 81d exposed from the upper surface of the base 210.

The circuit board 250 may include the pad portions 257, each of which is disposed at the upper portion, the lower portion and the side surface between the upper portion and the lower portion.

The number of pad portions 257 may be plural. The pad portions may be disposed so as to correspond to the terminals 81a to 81d, or may be disposed at positions corresponding to the terminals 81a to 81d. For example, the four pad portions 247 corresponding to the terminals 81a to 81d may be disposed at the four corners or the corner portions of the circuit board 250, without being limited thereto.

In another embodiment, the pad portions may be disposed only at two corners or two corner portions of the circuit board 250, and may be conductively connected to the two terminals 251 of the circuit board 250 in order to provide a drive signal to the first coil. For example, the two corners, at which the pad portions are disposed, may be corners that are positioned in a diagonal direction of the circuit board, or two corners included on a single side of the circuit board.

In a further embodiment, four pad portions may be disposed at four corners or four corner portions of the circuit board 250, and the pad portions disposed at two corners may be soldered to the terminals (for example, 81*a* and 81*b*) and may be conductively connected to two terminals 251 of the circuit board 250. The pad portions that are disposed at the remaining two corners may be soldered to the terminals (for example, 81*a* and 81*b*) but may not be conductively connected to the terminals 251 of the circuit board 250. The reason for this is to prevent the occurrence of problems such as mechanical tilting of the lens moving apparatus when all four pad portions are soldered to the terminals.

The pad portions 257 may be Au-plated layers or copper-plated layers including Au.

For example, the pad portions 257 may be respectively provided at the grooves 71*a* to 71*d* in the circuit board 250. Although FIG. 12 illustrates only the pad portion provided in the groove 71*a*, the description regarding the pad portion shown in FIG. 12 may be equally applied to the pad portions proved in the other grooves 71*b* to 71*d*.

The pad portion 257 of the circuit board 257 may be disposed at the upper surface of the circuit board 250, the lower surface of the circuit board 250 and the side surface connecting the upper surface to the lower surface of the circuit board 250.

For example, the pad portion 257 may be disposed at the side surface of the groove (for example, 71*a*), the upper surface of the circuit board 250 abutting the side surface of the groove (for example, 71*a*) and the lower surface of the circuit board 250 abutting the side surface of the groove (for example, 71*a*).

For example, the pad portion 257 of the circuit board 250 may include a first pad 259*b* disposed at the lower portion of the circuit board 250 abutting the side surface of the groove 71*a*, a second pad 259*b* disposed at the upper portion of the circuit board 250 abutting the side surface of the groove 71*a*, and a third pad 605 disposed at the side surface of the groove 71*a* so as to connect the first pad 259*b* to the second pad 259*a*.

The third pad 605 may be disposed at the side surface of the circuit board 250.

The side surface of each of the grooves 71*a* to 71*d* in the circuit board 250 may have formed therein a via or a groove, and a portion (for example, the third pad 605) of the pad portion 257 may be disposed in the via or the groove.

The third pad 605 of the pad portion 257 of the circuit board 250 may have a form depressed from the side surface of the groove 71*a*, for example, the form of a semicircular via.

The radius of the via may be, for example, 0.1 mm~0.5 mm, without being limited thereto. For example, the radius of the via may be 0.2 mm~0.3 mm. For example, the radius of the via may be 0.2 mm When the radius of the via is smaller than 0.1 mm, improvement in bonding force and solderability between the pad portion 257 of the circuit board 250 and the terminal may be insufficient. When the radius of the via is larger than 0.5 mm, the pad portion 257 may be enlarged more than necessary, relative to the second coupler 320 of each of the terminals 81*a* to 81*d*, thereby increasing the manufacturing costs and lowering freedom in design of the pattern of the circuit board 250.

The first pad 259*b* of the pad portion 257 of the circuit board 250 may face the terminal (for example, 81*a*) in the optical-axis direction.

The first pad 259*b* of the pad portion 257 of the circuit board 250 may abut the exposed region 321 of the second coupler 320 of the first terminal 81*a*.

Referring to FIG. 15, the circuit board 250 may include a first insulation layer 601, a first conductive layer 602*a* disposed on the upper surface of the insulation layer 601, a second insulation layer 603*a* disposed on the upper surface of the first conductive layer 602*a*, a second conductive layer 602*b* disposed on the lower surface of the first insulation layer 601, and a third insulation layer 603*a* disposed on the lower surface of the second conductive layer 602*b*.

For example, a first adhesive layer may be disposed between the first insulation layer 601 and the first conductive layer 602*a*, and a second adhesive layer may be disposed between the third insulation layer 603*a* and the second conductive layer 602*b*.

The first conductive layer 602*a* may be a patterned metal layer, for example, a Cu-plated layer.

The second conductive layer 602*b* may be a metal layer (for example, a Cu layer) or a patterned metal layer.

For example, the first conductive layer 602*a* may be patterned so as to include wires and pads, which are conductively connected to the supports 220-1 to 220-4, the second coil 230 and the second position sensor 240.

The first to third insulation layers 601, 603*a* and 603*b* may be made of resin, for example, polyimide, without being limited thereto.

The first pad 259*b* may be disposed on the lower surface of the second conductive layer 602*b*, and the second pad 259*a* may be disposed on the upper surface of the first conductive layer 602*a*.

For example, the lower surface of the first pad 259*b* may be positioned higher than the lower surface of the third insulation layer 603*b*.

For example, each of the second pad 259*a* of the pad portion 257 may be conductively connected to a corresponding one of the terminals 251 of the circuit board 250 via the first patterned conductive layer 602*a*.

The upper surface of the first conductive layer 602*a* may include a region 59*a*, which is exposed from the second insulation layer 603*a* so as to be brought into contact with the second pad 259*a*, and the lower surface of the second conductive layer 602*b* may include a region 59*b*, which is exposed from the third insulation layer 603*b* so as to be brought into contact with the first pad 259*b*.

For example, the first pad 259*b* may be disposed at the exposed region 59*b* of the lower surface of the second conductive layer 602*b*, and the second pad 259*a* may be disposed at the exposed region 59*a* of the upper surface of the first conductive layer 602*a*.

For example, the surface area of the first pad 259*b* that is in contact with the exposed region 59*b* of the lower surface of the second conductive layer 602*b* may be larger than the surface area of the second pad 259*a* that is in contact with the exposed region 59*a* of the upper surface of the first conductive layer 602*a*.

The exposed region 14*a* of the circuit board 250 may be a portion of the first patterned conductive layer 602*a* exposed from the second insulation layer 603*a*, and the upper surface of the exposed region 14*a* may be the upper surface of the first patterned conductive layer 602*a*.

Each of the pad portions 41 to 44 of the circuit board 250 and a corresponding one of the pad portions 257 may be spaced apart from each other, may be conductively isolated from each other and may be positioned in the exposed region 14a.

For example, a depth toward the upper surface from the lower surface of the circuit board 250 may be present between the lower surface of the first pad 259b of the circuit board 250 and the lower surface of the third insulation layer 603b or between the lower surface of the first pad 259b and the exposed region 321 of the second coupler 320, and the depth may be 25.5 mm~27.5 mm.

The third pad 605 of the pad portion 257 may be disposed on the side surface of the first insulation layer 601, may connect the second pad 259a of the pad portion 257 to the first pad 259b, and may be a plated layer. For example, the thickness of each of the first pad 259b, the second pad 259a and the third pad 605 of the pad portion 257 may be 10 mm~12 mm.

Although the third pad 605 of the pad portion 257 may be, for example, an Au-plated layer, the disclosure is not limited thereto.

By means of a conductive adhesive member or solder, the exposed region 321 of the second coupler 320 of each of the terminals 81a to 81d and the pad portion 257 of the circuit board 257 may be coupled to each other and may be conductively connected to each other.

Although the surface area of the first pad 259b of the pad portion 257 of the circuit board 250 may be larger than the surface area of the second pad 259a, the disclosure is not limited thereto.

Referring to FIG. 16, the ratio (H3/H1) of the first distance H3 to the second distance H1 may be 1.18~1.2, and the ratio (H3/H) of the first distance H3 to the third distance H may be 1.16~1.17. For example, the ratio (H3/H) may be 1.1667, and the ratio (H3/H1) may be 1.188.

The first distance H3 may be the distance between the lower surfaces of the upper springs 150-1 to 150-4 and the lower surfaces of the first couplers 310 of the terminals 81a to 81d. The second distance H1 may be the distance between the lower surfaces of the upper springs 150-1 to 150-4 and the lower surface of the circuit member 231. The third distance H may be the distance between the lower surfaces of the upper springs 150-1 to 150-4 and the lower surface of the circuit board 250.

Generally, as the thickness of a cellular phone is decreased, the height of a camera module is also decreased. Furthermore, as the height of the camera module is decreased, the length of the OIS wire (for example, the above-mentioned support 220-1 to 220-4) of the lens moving apparatus is decreased, and thus power consumption may be increased due to the decreased length of the OIS wire. Decreasing the diameter of the OIS wire in order to prevent the increase in power consumption and the consequent deterioration in reliability entails concerns about disconnection of the OIS wire and deterioration in reliability of OIS driving.

According to the embodiment, since the supports 220-1 to 220-4 are coupled to the lower surfaces of the terminals 81a to 81d positioned under the circuit board 250, it is possible to increase the length of the supports 220-1 to 220-4. Consequently, it is possible to reduce power consumption by reducing the intensity of current flowing through the supports 220-1 to 220-4 and to prevent deterioration in reliability of OIS driving attributable to the decreased diameter of the supports 220-1 to 220-4.

When the ratio (H3/H1) is smaller than 1.18 or the ratio (H3/H) is less than 1.16, the increase in the length of the supports 220-1 to 220-4 may be insufficient, thereby making it impossible to obtain an effect of reducing power consumption and making it impossible to prevent deterioration in reliability of OIS operation attributable to the reduced diameter of the supports 220-1 to 220-4.

Meanwhile, when the ratio (H3/H1) is greater than 1.2 or the ratio (H3/H) is greater than 1.17, the thickness of the lens moving apparatus may be increased.

The distance H2 between the lower surfaces of the upper springs 150-1 to 150-4 and the upper surface of the circuit member 231 may be 1.86 mm.

For example, the height (or the thickness in the optical-axis direction) of the housing 140 may be 1.3 mm~2 mm. For example, the height (or the thickness in the optical-axis direction) of the housing 140 may be 1.4 mm~1.6 mm. For example, the height (or the thickness in the optical-axis direction) of the housing 140 may be 1.51 mm.

Figure 17A:
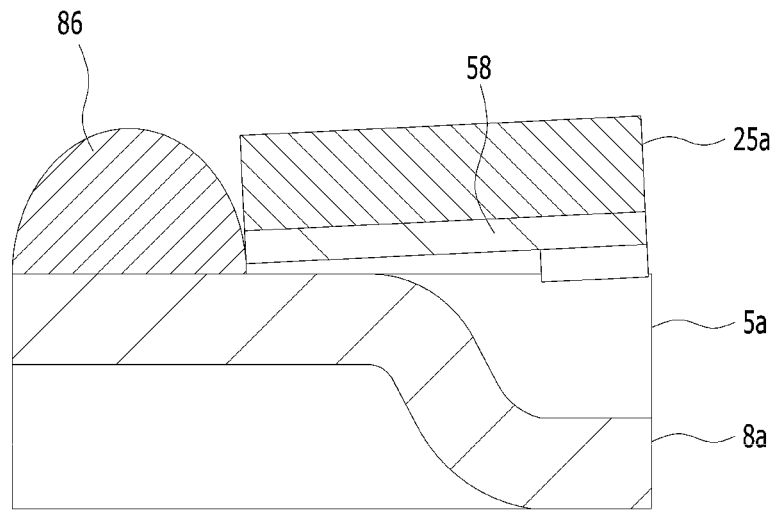
FIG. 17A illustrates the coupling between the circuit board and the terminal using the solder.
Figure 17B:
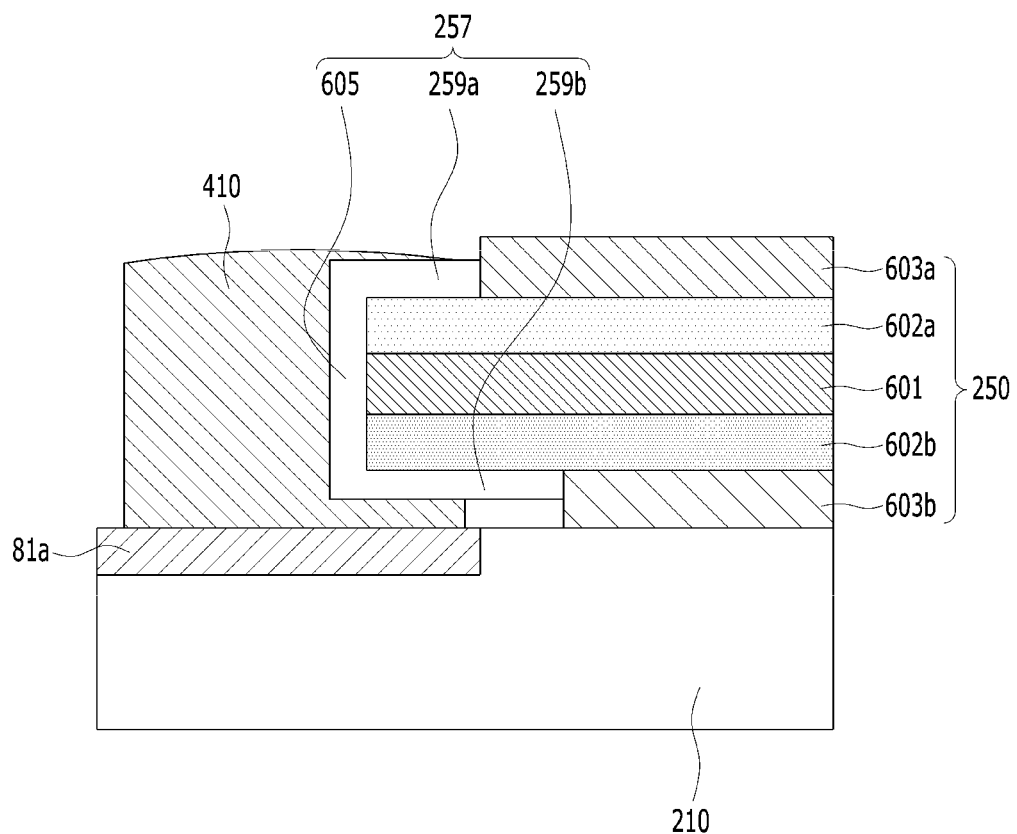
FIG. 17B illustrates the coupling between the pad portion of the circuit board and the terminal according to an embodiment.

FIG. 17A illustrates the coupling between the circuit board 25a and the terminal 8a by means of the solder 86. FIG. 17B illustrates the coupling between the pad portion 257 of the circuit board 250 and the terminal 81a according to the embodiment.

Referring to FIG. 17A, the circuit board 25a may include a pad portion 58 disposed only at the lower surface thereof. When the pad portion 58 is disposed only at the lower surface of the circuit board 25a, the space between the lower surface of the circuit board 25a and the terminal 8a may be reduced. Hence, the solder may not easily enter a space between the circuit board 25a and the terminal 8a, thereby deteriorating solderability during soldering, and thus electrical disconnection between the terminal 8a and the circuit board 250 may occur.

Referring to FIG. 17B, the lens moving apparatus 100 according to the embodiment may include a conductive adhesive member or solder 410 for coupling the terminals 81a to 81d to the pad portions of the circuit board 250.

The solder 410 may be disposed between the second coupler 320 (for example, the exposed region 321) and the first pad 259b of the pad portion 257 of the circuit board 250. Furthermore, the solder 410 may be disposed on the second pad 259a and the third pad 605.

For example, the solder 410 may be disposed between the first to third pads 259b, 259a and 605 of the circuit board 250 and the second coupler 320 (for example, the exposed region 321).

Since the pad portion 257 according to the embodiment includes the first pad 259b disposed at the lower portion of the circuit board 250, the third pad 605 provided at the side surface of each of the grooves 71a to 71d in the circuit board 250 and the second pad 259a disposed at the upper portion of the circuit board 250, the solder may be bonded to the third pad 605 and the second pad 259a of the circuit board 250 during soldering. Hence, the surface tension of the solder may be increased, and thus infiltrating force with which the solder infiltrates between the first pad 259b of the circuit board 250 and the exposed region 231 of each of the terminals 81a to 81d may be increased. As a result, it is possible to improve the ease of soldering of the pad portions 257 of the circuit board 250 to the terminals 81a to 81d and to increase the binding force therebetween, and thus it is possible to prevent electrical disconnection of the terminals from the circuit board.

Furthermore, since the third pad 605 of the circuit board 250 has a curved shape, the contact area thereof may be increased. Consequently, it is possible to improve ease of soldering and the binding force between the pad portions 257 of the circuit board 250 and the terminals 81a to 81d.

Although the embodiment shown FIGS. 1 to 17 does not includes an AF location sensor for AF feedback operation, the disclosure is not limited thereto. Another embodiment may include an AF location sensor for AF feedback operation. In this case, the AF location sensor may be positioned at the bobbin 110.

A further embodiment may further include an AF location sensor and a sensing magnet. In this case, the AF location sensor may be disposed at one of the housing and the bobbin, and the sensing magnet may be disposed at the other of the housing and the bobbin.

When the lens moving apparatus according to the embodiment include the AF location sensor, the embodiment may include a sufficient number of upper springs and supports in order to conductively connect the AF location sensor to the circuit board. Alternatively, the second elastic member may include a plurality of lower springs, and the AF location sensor and the circuit board may be conductively connected to each other via the upper springs and the lower springs.

Figure 18A:
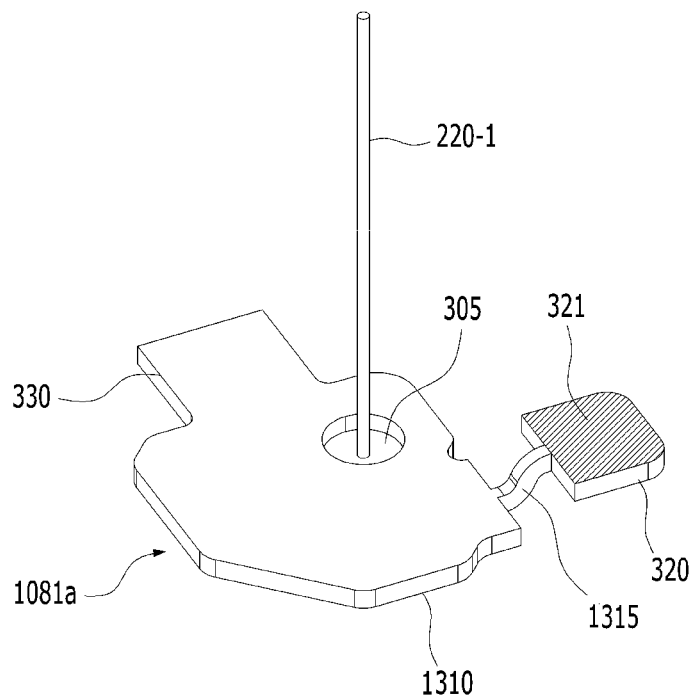
FIG. 18A is a perspective view of the first terminal and the first support according to another embodiment.
Figure 18B:
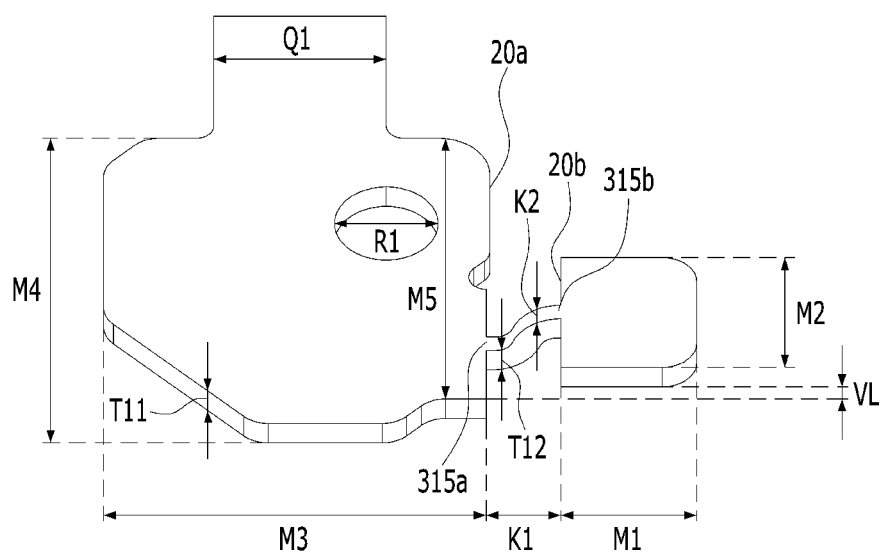
FIG. 18B is a perspective view of the first terminal shown in FIG. 18A.

FIG. 18A is a perspective view of a first terminal 1081a and first support 220-1 according to another embodiment. FIG. 18B is a perspective view of the first terminal of FIG. 18A.

The first terminal 1081a shown in FIGS. 18A and 18B is another embodiment or a modification of the first terminal 81a shown in FIG. 11.

The description regarding the first terminal 1081a shown in FIGS. 18A and 18B may be equally applied to the remaining second to fourth terminals 1081b to 1081d.

Referring to FIGS. 18A and 18B, the first terminal 1081a may include a first coupler 1310, a second coupler 320 and a connector 1315. The first coupler 1310 may be referred to as a "first connector" or a "first portion", the second coupler 320 may be referred to as a "second connector" or a "second portion", and the connector 1315 may be referred to as a "third connector" or a "third portion".

For example, the connector 1315 may connect a portion of one side surface (hereinafter, referred to as a "first side surface 20a") of the first coupler 1310 to a portion of one side surface (hereinafter, referred to as a "first side surface 20b") of the second coupler 320.

The connector 1315 may include a curved portion, a bent portion and/or a bent portion.

Although the connector 1315 may have, for example, a shape that is bent or curved from the first coupler 1310, the disclosure is not limited thereto. In another embodiment, the connector may have the form of a linear or planar plate.

Since the connector 1315 has a curved portion or a bent portion, it is possible to increase the length of the connector 1315 and to improve an effect of suppressing heat transmission through the connector 1315.

The connector 1315 may project or extend from the first side surface 20a of the first coupler 1310, and may project or extend from the first side surface 20b of the second coupler 320.

For example, one end of the connector 1315 may project or extend from a portion of the first side surface 20a of the first coupler 1310, and the other end of the connector 1315 may project or extend from a portion of the first side surface 20b of the second coupler 320.

For example, the ratio of the cross-sectional area (for example, 0.01 [mm²]) of the connector 1315 to the surface area of the first side surface 20a of the first coupler 1310 in the optical-axis direction may be 1:5~1:8.

For example, the ratio of the cross-sectional area of the connector 1315 to the surface area of the first side surface 20b of the second coupler 320 in the optical-axis direction may be 1:4~1:6.

Although the connector 1315 may be integrally formed with the first connector 1310 and the second coupler 320, the disclosure is not limited thereto. In another embodiment, the connector may be prepared separately from the first coupler 1310 and the second coupler 320, may be assembled with the base 210, and may be disposed at the side surface of the base 210.

The second coupler 320 may be disposed between the base 210 and the circuit board 250, and the first coupler 1310 may be disposed lower than the second coupler 320. The connector 1315 may connect the first coupler 1310 to the second coupler 320 in an inclined direction toward the second coupler 320 from the first coupler 1310.

The upper surface of the second coupler 320 may be exposed from the upper surface of the base 210, and the lower surface of the first coupler 1310 may be exposed from the lower surface of the base 210.

Although the second coupler 320 may have the form of a rectangular parallelepiped plate in FIG. 18B, the disclosure is not limited thereto. For example, the upper surface of the second coupler 320 may have a polygonal shape such as a rectangular shape, a circular shape, an elliptical shape, a semicircular shape, a semielliptical shape or a sector shape, without being limited thereto.

The first side surface 20a of the first coupler 1310 may have formed therein a groove, which is coupled to the protrusion provided at the first side surface 27a of the stepped portion 26 of the base 210. Consequently, it is possible to increase the binding force between the first coupler 1310 and the base 210.

For example, the upper surface of the second coupler 320 may have a shape that extends from the connector 1315 and gradually increases in area with increasing distance from the connector 1315.

The surface area of the first coupler 1310 (for example, the surface area of the upper surface thereof) may be larger than the surface area of the second coupler 320 (for example, the surface area of the upper surface thereof).

For example, the surface area of the upper surface of the second coupler 320 may be larger than the surface area of the upper surface of the connector 1315.

The length M4 (see FIG. 18B) of the first coupler 1310 in a first horizontal direction may be greater than the horizontal length M2 of the second coupler 320 in the first horizontal direction (M4>M2).

For example, the first horizontal direction may be a direction parallel to the first side surface of the first coupler 1310 or the first side surface of the second coupler 320.

Alternatively, the first horizontal direction may be the longitudinal direction of the upper surface of the first coupler 1310 or the longitudinal direction of the upper surface of the second coupler 320.

Alternatively, the first horizontal direction may be a direction toward the fourth corner portion 91d from the first corner portion 91a of the base 210.

For example, the length M3 (see FIG. 18B) of the first coupler 1310 in a second horizontal direction may be greater than the length M1 of the second coupler 320 in the second horizontal direction (M3>M1).

For example, the second horizontal direction may be a direction perpendicular to the first horizontal direction or a direction toward the second corner portion 91b from the first corner portion 91a of the base 210.

The second horizontal direction may be a direction toward a second imaginary plane, which is the same plane as the first side surface of the second coupler 320, from a first imaginary plane, which is the same plane as the first side surface of the first coupler 1310 and is perpendicular to the first imaginary plane and the second imaginary plane.

The first coupler 1310 may be positioned lower than the lower surface of the base 210 but higher than the first holder 600 and the second holder 800 of the camera module 200 (see FIG. 18).

The width K2 of the connector 1315 may be less than the length M5 of the first side surface 20a of the first coupler 1310 in the first horizontal direction and the length M2 of the first side surface 20b of the second coupler 320 in the first horizontal direction (K2<M5, M2).

The horizontal distance K1 between the first coupler 1310 and the second coupler 320 in the second horizontal direction may be less than the length M1 of the second coupler 320 in the second horizontal direction (K1<M1).

For example, the horizontal distance K1 may be the shortest distance between the first imaginary plane, which is the same plane as the first side surface of the first coupler 1310, and the second imaginary plane, which is the same plane as the first side surface of the second coupler 320.

The length of the connector 1315 may be less than the length M1 of the second coupler 320 in the second horizontal direction.

For example, the length of the connector 1315 may be the shortest distance between the first side surface of the first coupler 1310 and the first side surface of the second coupler 320.

For example, the length of the connector 1315 may also be the shortest distance between the first coupling region 1315a of the connector 1315 connected to the first side surface of the first coupler 1310 and the second coupling region 1315b of the connector 1315 connected to the first side surface of the second coupler 310.

For example, the length of the connector 1315 may also be the distance between the first coupler 1310 and the second coupler 320.

The surface area of the connector 1315 (for example, the surface area of the upper surface thereof) may be smaller than the surface area of the second coupler 320 (for example, the surface area of the upper surface thereof).

For soldering between the second coupler 320 and the pad portion 257 of the circuit board 250, heat is supplied to the second coupler 320 by means of a heating blower, and the heat supplied to the second coupler 320 may be transmitted to the first coupler 1310 via the connector 1315.

Here, because the surface area of the first coupler 1310 is larger than the surface area of the second coupler 320, the amount of heat transmitted to the first coupler 1310 may be increased. Hence, because the solder is not sufficiently melted and thus the solder is not efficiently transmitted to the space (or the gap) between the pad portion 257 or the circuit board 250 and the second coupler 320, poor soldering between the second coupler 320 and the pad portion 257, for example, cold soldering may occur.

According to the embodiment, since the width K2 of the connector 1315, which is a connecting path connecting the first coupler 1310 to the second coupler 320, is decreased in order to maximize the melting point of lead or solder, it is possible to suppress transmission of heat to the first coupler 1310 from the second coupler 320 and to allow the solder to be easily melted in a short period of time. Consequently, it is possible to prevent poor soldering, for example, cold soldering between the second coupler 320 and the pad portion 257, and to ensure reliability in soldering.

The length M3 of the first coupler 1310 may be 1 [mm]~2 [mm].

For example, the length M3 of the first coupler 1310 may be 1.12 [mm].

The length M4 of the first coupler 1310 may be 1 [mm]~2 [mm].

For example, the length M4 of the first coupler 1310 may be 1.17 [mm].

The length M1 of the second coupler 320 may be 0.3 [mm]~0.5 [mm].

For example, the length M1 of the second coupler 320 may be 0.39 [mm].

The length M2 of the second coupler 320 may be 0.3 [mm]~0.5 [mm].

For example, the length M2 of the second coupler 320 may be 0.45 [mm].

For example, the length M2 of the second coupler 320 may be greater than the length M1 of the second coupler 310, without being limited thereto. In another embodiment, the length M2 of the second coupler 320 may be equal to or less than the length M1 of the second coupler 310.

The horizontal distance K1 between the first coupler 1310 and the second coupler 320 may be 0.15 [mm]~0.25 [mm]. For example, the horizontal distance K1 may be 0.22 [mm].

For example, the vertical distance VL between the first coupler 1310 and the second coupler 320 may be 0.03 [mm]~0.07 [mm]. For example, the horizontal distance VL may be the shortest distance between a third imaginary plane, which is the same plane as the upper surface of the first coupler 1310 and a fourth imaginary plane, which is the same plane as the lower surface of the second coupler 310.

The vertical distance VL may be less than the width K2 of the connector 1315 (VL<K2). In another embodiment, the vertical distance VL may be equal to the width K2 of the connector 1315.

When the horizontal distance K1 is less than, for example, 0.15 [mm], the length of the connector 1315 may be decreased and the effect of suppressing heat transmission may be reduced, thereby making it impossible to prevent cold soldering. When the vertical distance K1 is greater than 0.25 [mm], the length of the connector 1315 may be increased and the durability thereof may be lowered, thereby causing the connector 1315 to be cut.

Furthermore, when the vertical distance VL is less than 0.03 [mm], the effect of increasing the length of the connector by virtue of the bent portion may be insufficient, and thus an effect of suppressing heat transmission is lowered, thereby making it impossible to prevent cold soldering.

When the vertical distance VL is greater than, for example, 0.07 [mm], the length of the connector 1315 may be increased and the durability thereof may be lowered, thereby causing the connector 1315 to be cut.

The width K2 of the connector 1315 may be 0.05 [mm]~0.2 [mm].

For example, the width K2 of the connector 1315 may be 0.1 [mm].

When the width K2 of the connector 1315 is less than 0.05 [mm], the durability of the connector 1315 may be lowered, thereby causing electrical disconnection. When the width K2 of the connector 1315 is greater than 0.2 [mm], the effect of suppressing heat transmission may be lowered, thereby causing the connector 1315 to be cut and thus causing electrical disconnection. When the width K2 of the connector 1315 is greater than 0.2 [mm], the effect of suppressing heat transmission may be lowered, thereby making it impossible to prevent cold soldering.

The thickness T11 of the first coupler 1310 may be 0.08 [mm].

The thickness of the second coupler 320 may be equal to the thickness T11 of the first coupler 1310.

The thickness T12 of the connector 1315 may be 0.08 [mm].

Although the thickness T12 of the connector 1315 may be equal to the thickness T11 of the first coupler 1310, the disclosure is not limited thereto. In another embodiment, the thickness of the connector 1315 may be less than the thickness of the first coupler 1310.

For example, the ratio (A1:A2) of the surface area A1 of the upper surface of the second coupler 310 to the surface area A2 of the upper surface of the first coupler 1310 may be 1:4~1:40.

For example, the ratio (A3:A1) of the surface area A3 of the upper surface of the connector 1315 to the surface area A1 of the upper surface of the second coupler 320 may be 1:9~1:30.

When the value (A1/A3) obtained by dividing the surface area A1 of the upper surface of the second coupler 320 by the surface area A3 of the upper surface of the connector 1315 is less than 9, an effect of suppressing heat transmission may be lowered, thereby making it impossible to prevent cold soldering.

On the other hand, when the value (A1/A3) obtained by dividing the surface area A1 of the upper surface of the second coupler 320 by the surface area A3 of the upper surface of the connector 1315 is less than 30, the durability of the connector 1315 may be lowered, thereby causing the connector 1315 to be cut and causing electrical disconnection.

The ratio (K2:M2) of the width K2 of the connector 1315 to the length M2 of the second coupler 320 may be 1:1.5~1:10.

When the value (M2/K2) obtained by dividing the length M2 of the second coupler 320 by the width K2 of the connector 1315 is less than 1.5, an effect of suppressing heat transmission may be lowered, thereby making it impossible to prevent cold soldering.

When the value (M2/K2) obtained by dividing the length M2 of the second coupler 320 by the width K2 of the connector 1315 is less than 10, the durability of the connector 1315 may be lowered, thereby causing the connector 1315 to be cut and causing electrical disconnection.

The first coupler 1310 may have therein the hole 305, through which the support (for example, 220-1) extends.

For example, the hole 305 in the first coupler 1310 may be a through hole.

The diameter R1 of the hole 305 may be 0.2 [mm]~0.4 [mm]. For example, the diameter R1 of the hole 305 may be 0.3 [mm].

The diameter R1 of the hole 305 may be larger than the width K2 of the connector 1315. In another embodiment, the diameter R1 of the hole 305 may be equal to the width K2 of the connector 1315.

The diameter or the thickness of each of the supports 220-1 to 220-4 may be smaller than the width of the connector 1315.

For example, the diameter or the thickness of each of the supports 220-1 to 220-4 may be 30 [μm]~70 [μm]. For example, the diameter or the thickness of each of the supports 220-1 to 220-6 may be 36[μm]~50 [μm].

The hole 305 in the first coupler 1310 may correspond to the hole 210a in the base 210, and may overlap the hole 210a in the base 210 in the optical-axis direction or in a direction toward the upper surface 21b from the lower surface 21a of the base 210.

One end of the support (for example, 220-1) may be coupled to the first coupler 510 of the first outer frame 151 of the upper spring (for example, 150-1).

The other end of the support (for example, 220-1) may extend through the hole 305 in the terminal (for example, 1081a) and may be coupled to the lower surface of the first coupler 1310 using the solder 902 (see FIG. 14).

For example, the lens moving apparatus 100 may further include the solder 902 coupling the other end of the support (for example, 220-1), having passed through hole 305, to the lower surface of the first coupler 1310.

The first coupler 1310 may be disposed or positioned under the first surface 26a of the stepped portion 26 of the base 210.

The second coupler 320 may be connected to one end of the first coupler 1310, and may be disposed or positioned under the second surface of the stepped portion 26 of the base 210.

A portion 321 of the second coupler 320 may be exposed from the upper surface 21b of the base 210 through the hole 22a in the stepped portion 26. Hereinafter, the portion 321 of the second coupler 320 is referred to as an exposed region 321 of the second coupler 320.

The first terminal 1081a may further include the extension 330 extending from another end of the first coupler 1310.

The extension 330 may be parallel to the first coupler 1310, may be positioned in the same plane as the first coupler 1310, and may be inserted into the base 210.

The extension 330 may increase the binding force between the first terminal 1081a and the base 210.

For example, the length Q1 of the extension 330 in the second horizontal direction may be 0.2 [mm]~0.8 [mm]. For example, the length Q1 of the extension 330 may be 0.5 [mm].

For example, the first coupler 1310, the second coupler 320 and the extension 330 may be integrally formed with one another. For example, the terminals 1081a to 1081d may be inserted into the base 210 through insert injection molding.

For example, the terminals 1081a to 1081d may be formed in conjunction with the base 210 through insert injection molding, and at least a portion of each of the first coupler 1310 and the second coupler 320 may be inserted into or disposed at the base 210.

For example, the terminals 1081a to 1081d may be insert injection molded in conjunction with the base 210, and the connector 1315 may be disposed in the base.

In another embodiment, the terminals may be attached or coupled to the lower surface of the upper surface of the base 210 rather than being insert injection molded in conjunction with the base.

Figure 18C:
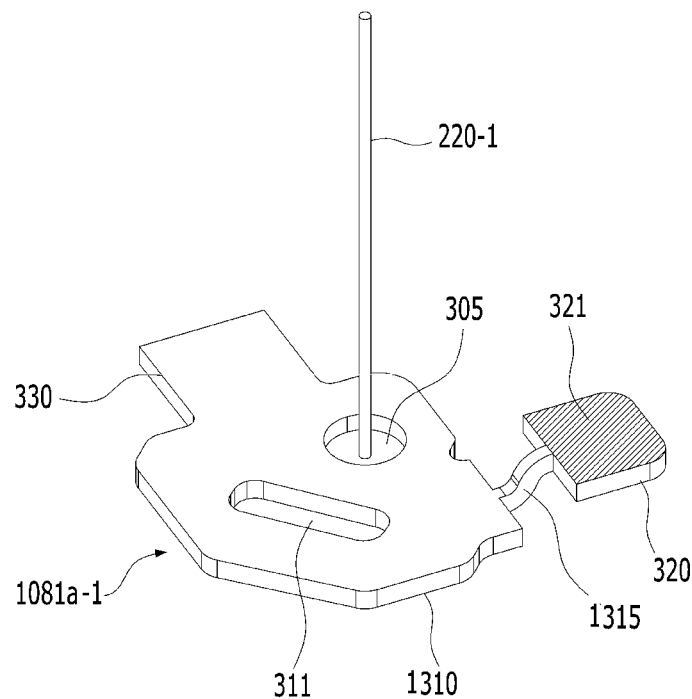
FIG. 18C is a perspective view of the first terminal and the first support according to another embodiment.

FIG. 18C is a perspective view of a first terminal 1081a-1 and a first support 220-1 according to another embodiment. The description regarding the first terminal 1081a-1 shown in FIG. 18C may be equally applied to the remaining second to fourth terminals.

Referring to FIG. 18C, the first coupler 1310 may further include a hole 311, which is coupled to the protrusion 28 of the stepped portion 26 of the base 210. The hole 311 in the first coupler 1310 may be coupled to the protrusion 28 of the base 210, thereby increasing the binding force between the base 210 and the terminals 1081a to 1081d and improving the solderability between the first coupler 1310 and the supports.

Because heat generated during soldering is efficiently transmitted to the outside of the first coupler 1310 as the surface area of the first coupler 1310 increases, ease of soldering between the support (for example, 220-1) and the hole 305 in the first coupler 1310 may be poor. The hole 311 in the first coupler 1310 may suppress the transmission of heat during soldering and may thus improve the solderability between the support (for example, 220-1) and the hole 305 in the first coupler 1310.

Furthermore, by virtue of the coupling between the hole 311 in the first coupler 1310 and the protrusion 28 of the base 210, it is possible to increase the binding force between the base 210 and the first terminals 1081a.

FIGS. 19A to 19E illustrate connectors 1315-1 to 1315-5 of the first terminal 1091a-1 according to a further embodiment.

The first terminals shown in FIGS. 19A to 19E may include examples of the connector having different widths and may be modifications of the first terminal 81a, 1081a. The description regarding the first terminal 1081a-1 may be equally applied to the remaining second to fourth terminals.

Figure 19A:
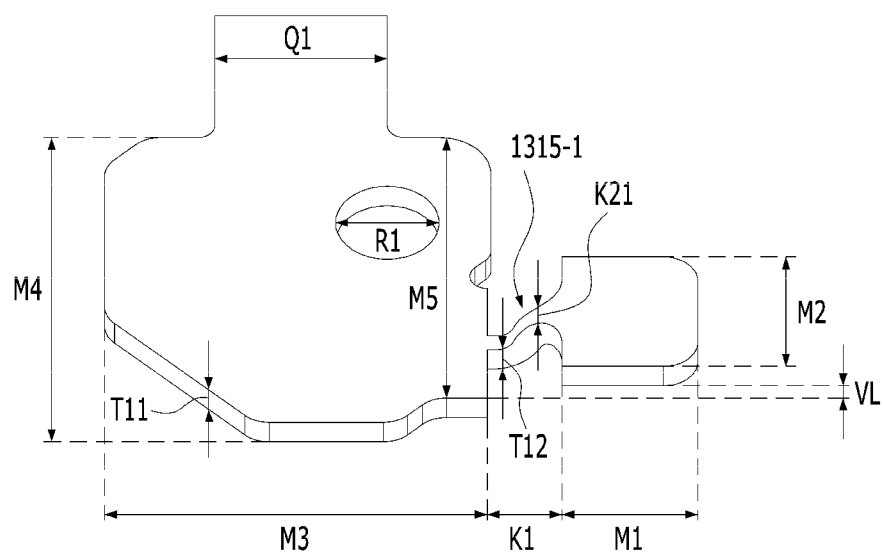
FIGS. 19A to 19E illustrate connectors of the first terminal according to other embodiments.

Referring to FIG. 19A, the width K21 of a connector 1315-1 may increase toward the second coupling region of the connector 1315-1 connected to the second coupler 320 from the first coupling region of the connector 1315-1 connected to the first coupler 1310.

For example, the width of the first coupling region of the connector 1315-1 may be less than the width of the second coupling region of the connector 1315-1.

Figure 19B:
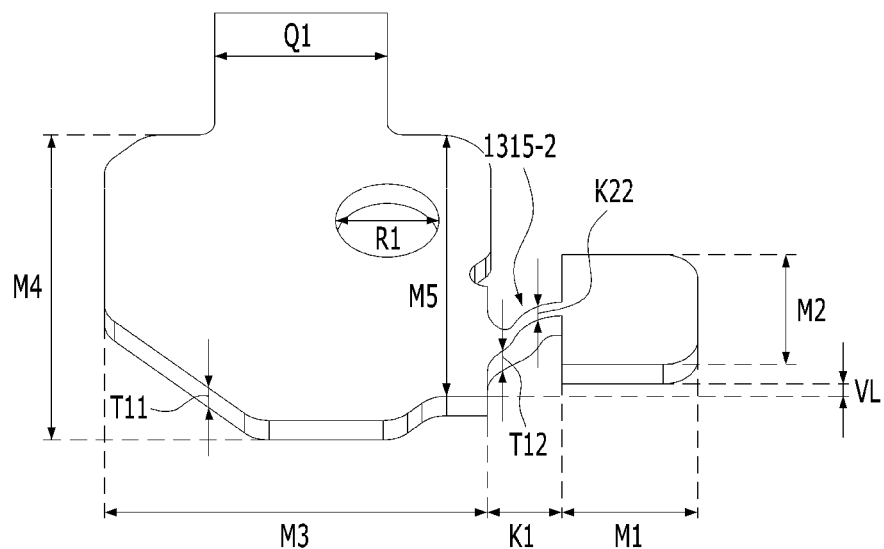

Referring to FIG. 19B, the width K22 of a connector 1315-2 may decrease toward the second coupling region of the connector 1315-1 connected to the second coupler 320 from the first coupling region of the connector 1315-1 connected to the first coupler 1310.

For example, the width of the first coupling region of the connector 1315-1 may be greater than the width of the second coupling region of the connector 1315-1.

Figure 19C:
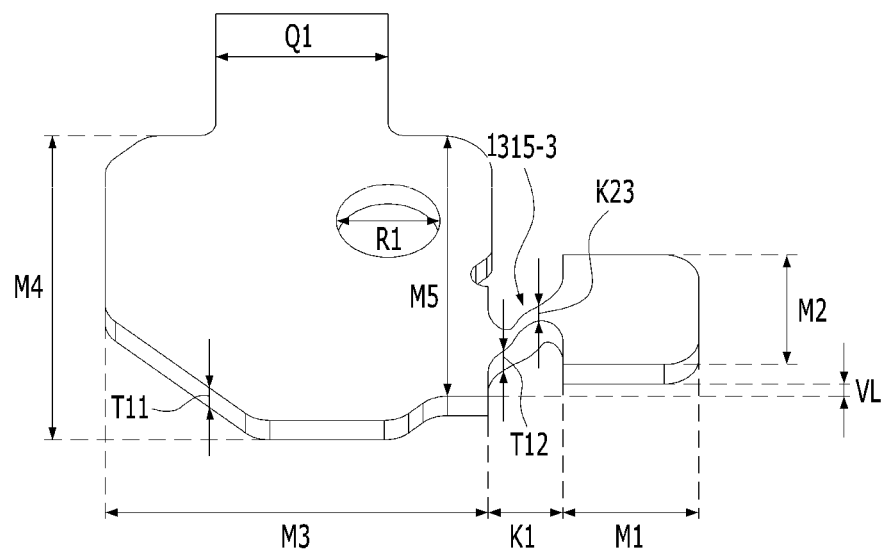

Referring to FIG. 19C, the width of a connector 1315-3 may decrease and then increase toward the second coupling region from the first coupling region.

Each of widths of two opposite ends of the connector 1315-3 may be greater than the width of the central portion of the connector 1315-3.

Figure 19D:
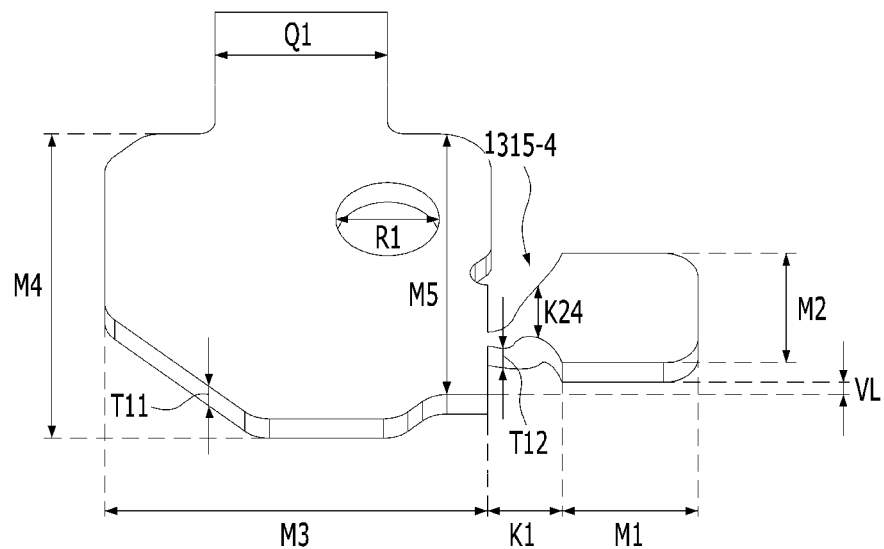

Referring to FIG. 19D, the first coupling region (or one end) of a connector 1315-4 may be connected to a portion of the first side surface of the first coupler 1310, and the second coupling region (or the other end) of the connector 1315-4 may be connected to the entire first side surface of the second coupler 320.

For example, the width K24 of the connector 1315-4 may increase toward the second coupling region from the first coupling region of the connector 1315-4.

Figure 19E:
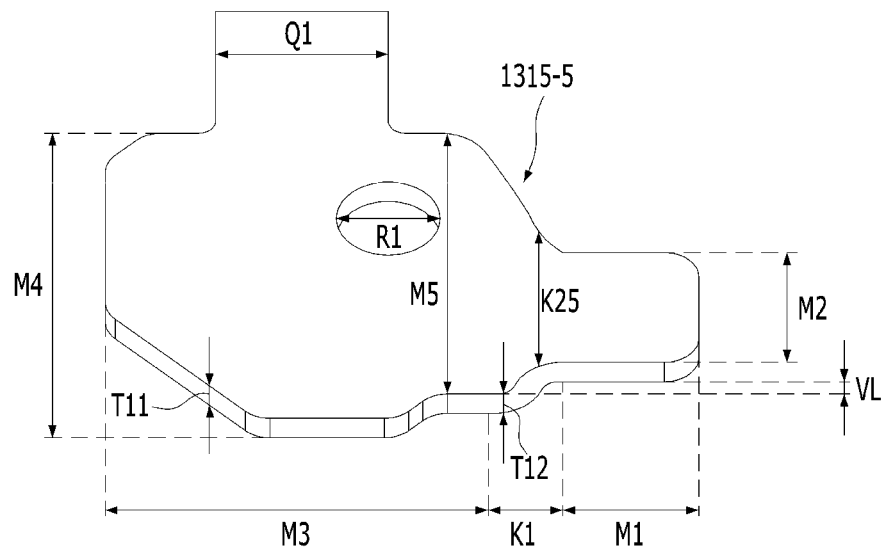

Referring to FIG. 19E, the first coupling region (or one end) of a connector 1315-5 may be connected to the entire first side surface of the first coupler 1310, and the second coupling (or the other end) of the connector 1315-5 may be connected to the entire first side surface of the second coupler 320.

For example, the width K25 of the connector 1315-5 may decrease toward the second coupling region from the first coupling region of the connector 1315-5.

In FIGS. 19A to 19E, each of the connectors 1315-1 to 1315-5 may have a linear shape, the width of which increases linearly, or a curved shape, the width of which increases non-linearly.

For example, each of the two side surfaces of each of the connectors 1315-1 to 1315-5 may be a planar surface or a curved surface (for example, a concave surface or a convex surface).

The description regarding the first terminal 81a shown in FIGS. 12 to 17B may be equally applied to the first terminal according to other embodiments shown in FIGS. 18A to 19E.

Meanwhile, the lens moving apparatuses according to the above-described embodiments may be used in various fields, such as, for example, those of a camera module or an optical device.

For example, the lens moving apparatus 100 according to the embodiment may be included in an optical instrument, which is designed to form the image of an object in a space using reflexion, refraction, absorption, interference, diffraction or the like, which is the characteristic of light, to extend eyesight, to record an image obtained through a lens or to reproduce the image, to perform optical measurement, or to propagate or transmit an image. For example, the optical instrument according to the embodiment may include a smart phone and a portable terminal equipped with a camera.

FIG. 20 is an exploded perspective view illustrating a camera module 200 according to an embodiment.

Referring to FIG. 20, the camera module 200 may include a lens or a lens barrel 400, the lens moving apparatus 100, an adhesive member 612, a filter 610, a first holder 600, a second holder 800, an image sensor 810, a motion sensor 820, a controller 830, and a connector 840.

The lens or the lens barrel 400 may be mounted in the bobbin 110 of the lens moving apparatus 100.

The first holder 600 may be located under the base 210 of the lens moving apparatus 100. The filter 610 may be mounted on the first holder 600, and the first holder 600 may have a raised portion 500 on which the filter 610 is seated.

The adhesive member 612 may couple or attach the base 210 of the lens moving apparatus 100 to the first holder 600. In addition to the attachment function described above, the adhesive member 612 may serve to prevent contaminants from entering the lens moving apparatus 100.

The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

The region of the first holder 600 in which the filter 610 is mounted may be provided with an opening in order to allow the light that passes through the filter 610 to be introduced into the image sensor 810.

The second holder 800 may be disposed under the first holder 600, and the image sensor 810 may be mounted on the second holder 600. The image sensor 810 may be a portion on which an image included in the light that passes through the filter 610 and that is introduced thereinto is formed.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, on which a circuit pattern may be formed, and to which various devices may be coupled.

The image sensor 810 may receive an image contained in the light introduced through the lens moving apparatus 100, 1100, 2100 and may convert the received image into electrical signals.

The filter 610 and the image sensor 810 may be spaced apart from each other so as to be opposite each other in the first direction.

The motion sensor 820 may be mounted on the second holder 800, and may be conductively connected to the controller 830 through the circuit pattern formed on the second holder 800.

The motion sensor 820 may output rotational angular speed caused by motion. The motion sensor 820 may be embodied as a dual-axis or triple-axis gyro sensor or an angular speed sensor.

The controller 830 may be mounted on the second holder 800. The second holder 800 may be conductively connected to the lens moving apparatus 100. For example, the second holder 800 may be conductively connected to the first coil 120, the second coil 230 and the position sensor 240 of the lens moving apparatus 100.

For example, a drive signal may be supplied to each of the first coil 120, the second coil 230 and the position sensor 240 through the second holder 800.

The connector 840 may be conductively connected to the second holder 800, and may have a port for the electrical connection of an external component.

Figure 21:
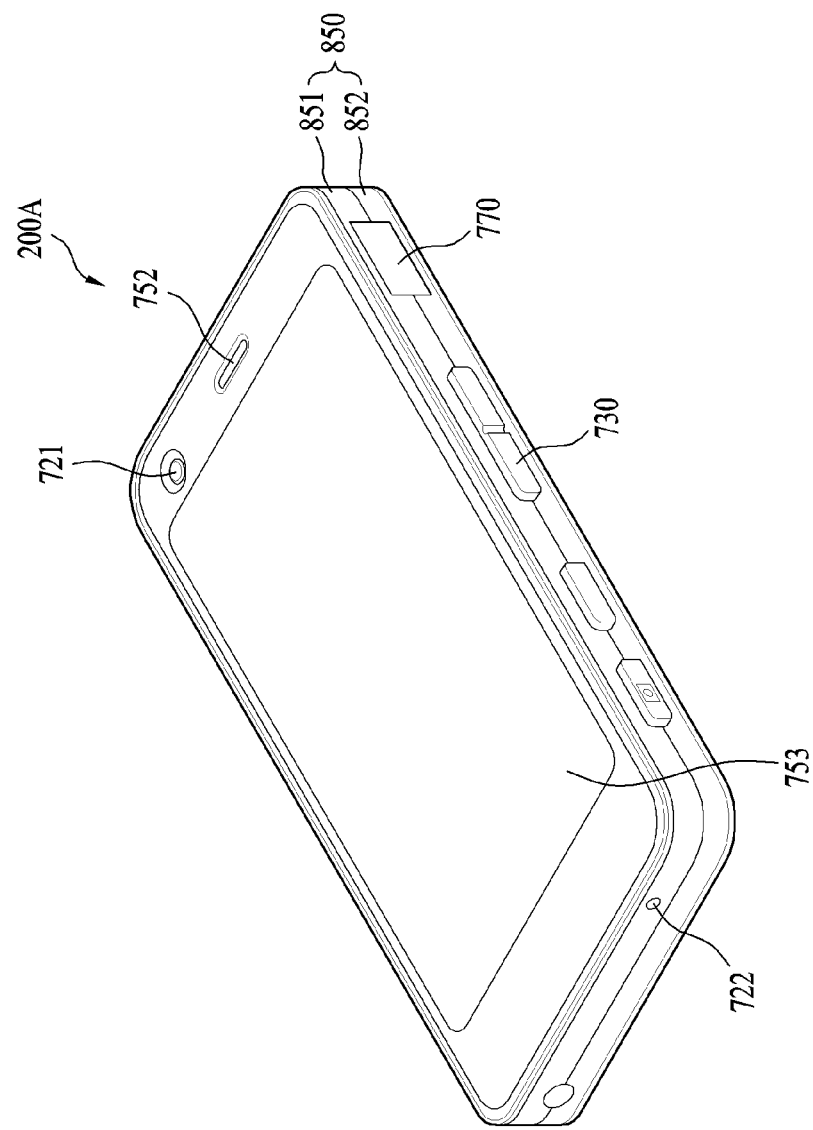
FIG. 21 is a perspective view of a portable terminal according to an embodiment.
Figure 22:
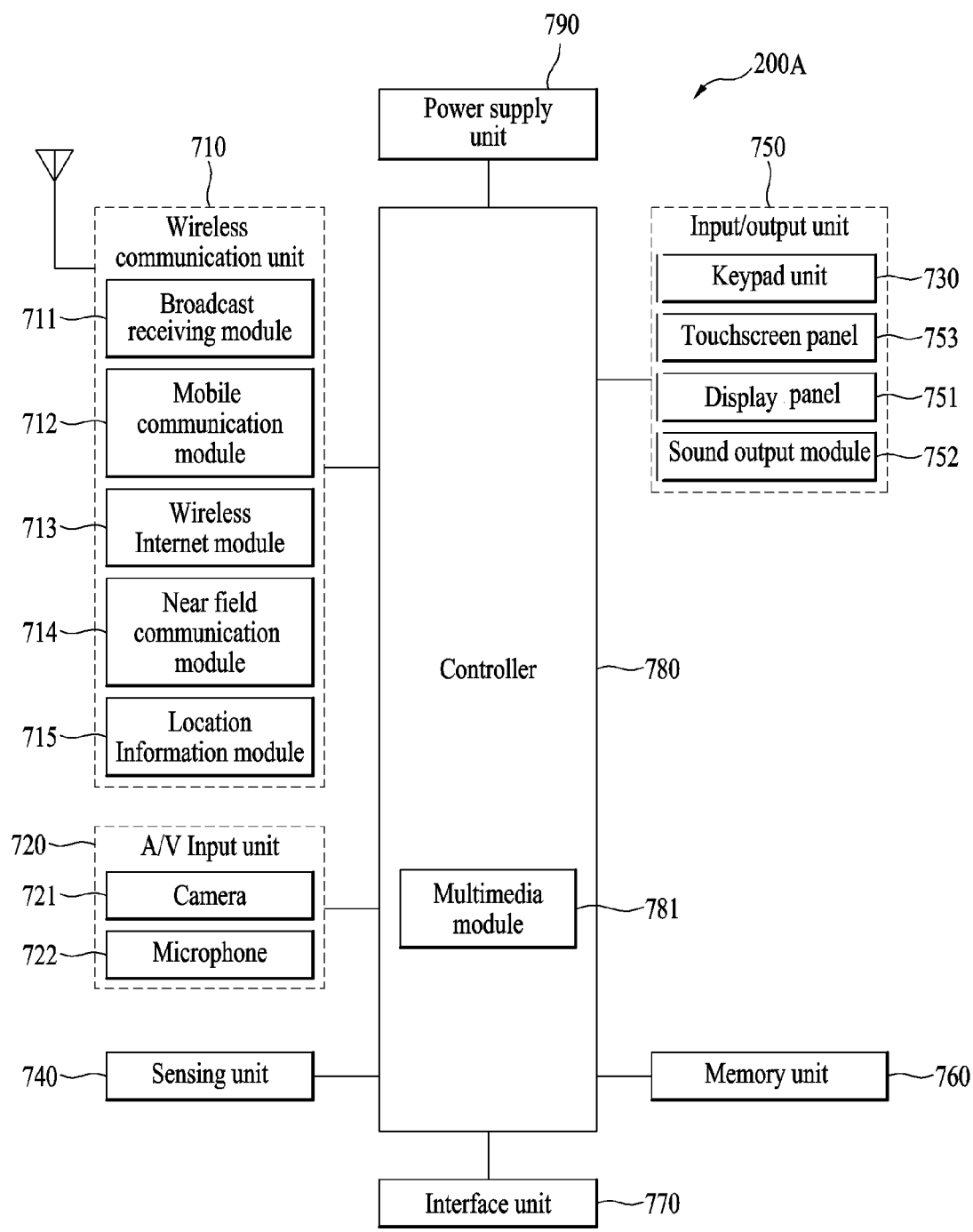
FIG. 22 is a view illustrating the configuration of the portable terminal illustrated in FIG. 21.

FIG. 21 is a perspective view illustrating a portable terminal 200A according to an embodiment. FIG. 22 is a view illustrating the configuration of the portable terminal 200A illustrated in FIG. 21.

Referring to FIGS. 21 and 22, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 21 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the camera module 200 according to the embodiment shown in FIG. 20.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals applied thereto. For example, the display module 751 may include at least one among a liquid crystal display, a thin-film-transistor-liquid crystal display, an organic light-emitting diode, a flexible display and a 3D display.

The sound output module 752 may output audio data received from the wireless communication unit 710 in, for example, a call signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180 or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configuration, effects and the like exemplified in the respective embodiments may be combined with other embodiments or modified by those skilled in the art. Accordingly, content related to these combinations and modifications should be construed as falling within the scope of the embodiments.

The embodiments may be applied to a lens moving apparatus capable of improving ease of soldering of a circuit board to terminals and preventing electrical disconnection of the terminals from the circuit board, and to a camera module and an optical device each including the same.

The invention claimed is:

1. A lens moving apparatus comprising:
 a housing;
 a bobbin disposed in the housing;
 a first coil disposed on the bobbin;
 a magnet disposed on the housing;
 an elastic member coupled both to the bobbin and to the housing;
 a base disposed to be spaced apart from the housing;
 a circuit board disposed between the housing and the base;
 a terminal disposed on the base; and
 a support connecting the elastic member and the terminal,
 wherein the terminal comprises:
  a first coupler comprising a circular hole with a first diameter;
  a second coupler coupled to the circuit board; and
  a connector connecting a portion of the first coupler to a portion of the second coupler,
 wherein the support comprises a suspension wire having a second diameter less than the first diameter and having a first end passing through the circular hole of the first coupler and being electrically coupled to the first coupler,
 wherein a second end of the suspension wire is electrically connected to the elastic member,
 wherein a lower surface of the second coupler is positioned higher than an upper surface of the first coupler, and
 wherein an area of the second coupler is smaller than an area of the first coupler.

2. The lens moving apparatus according to claim 1, wherein the connector comprises a curved portion or a bent portion.

3. The lens moving apparatus according to claim 1, wherein, when viewed from above, a horizontal distance between the first coupler and the second coupler is less than a length of the second coupler in a direction from the first coupler toward the second coupler.

4. The lens moving apparatus according to claim 1, wherein, when viewed from above, a length of the connector is less than a length of the second coupler in a longitudinal direction of the connector, and
 wherein the length of the connector is a distance between a first coupling region of the connector connected to a first side surface of the first coupler and a second coupling region of the connector connected to a first side surface of the second coupler.

5. The lens moving apparatus according to claim 1, wherein when viewed from a top, the area of the second coupler is larger than an area of the connector.

6. The lens moving apparatus according to claim 5, wherein a ratio of the area the connector to the area of the second coupler is 1:9 to 1:30.

7. The lens moving apparatus according to claim 1, wherein the second coupler is disposed between the base and the circuit board, and
 wherein the first coupler is disposed lower than the second coupler.

8. The lens moving apparatus according to claim 1, wherein the base comprises a protrusion, and
 wherein the terminal comprises a hole coupled to the protrusion of the base.

9. The lens moving apparatus according to claim 1, wherein the elastic member comprises a first elastic member disposed on an upper surface of the bobbin and a second elastic member disposed on a lower surface of the bobbin,
 wherein the support is coupled to the first elastic member, and
 wherein a width of the connector is less than a width of the first coupler.

10. The lens moving apparatus according to claim 1, wherein, when viewed from above, a horizontal distance between the first coupler and the second coupler is 0.15 mm to 0.25 mm, and
 Wherein, when viewed from a side, a vertical distance between the first coupler and the second coupler is 0.03 mm to 0.07 mm.

11. The lens moving apparatus according to claim 1, wherein the circuit board comprises a pad portion coupled to the second coupler.

12. The lens moving apparatus according to claim 11, comprising a solder disposed between the pad portion and the second coupler.

13. The lens moving apparatus according to claim 11, wherein the pad portion faces the second coupler of the terminal in an optical axis direction.

14. The lens moving apparatus according to claim 1, comprising a solder coupled with one end of the support passing through the circular hole of the first coupler and a lower surface of the first coupler.

15. A camera module comprising:
 a lens;
 a lens moving apparatus for mounting the lens according to claim 1; and
 an image sensor.

16. The lens moving apparatus according to claim 1, wherein the first end of the suspension wire passes through the circular hole of the first coupler without contacting inner circumference surfaces of the circular hole.

17. The lens moving apparatus according to claim 1, wherein the suspension wire comprises at least one single suspension wire extending from the terminal to the elastic member at a corner of the housing.

18. The lens moving apparatus according to claim 17, wherein the at least one single suspension wire extends in a longitudinal direction from the terminal to the elastic member.

19. The lens moving apparatus according to claim 1, wherein the suspension wire comprises at least two single suspension wires extending from the terminal to the elastic member at one corner of the housing.

20. The lens moving apparatus according to claim 1, wherein the suspension wire extends from the terminal to the elastic member without contacting other components of the lens moving apparatus disposed between the terminal and the elastic member.

21. The lens moving apparatus according to claim 1, wherein the second diameter of the suspension wire is less than a radius of the circular hole.

22. The lens moving apparatus according to claim 1, wherein the first end of the suspension wire is coupled to the first coupler by a solder.

23. The lens moving apparatus according to claim 1, wherein a width of the connector is less than a width of the first coupler.

24. A lens moving apparatus comprising:
a housing;
a bobbin disposed in the housing;
a first coil disposed on the bobbin;
a magnet disposed on the housing;
an elastic member coupled to the housing;
a base disposed to be spaced apart from the housing;
a circuit board disposed between the housing and the base;
a terminal disposed on the base; and
a support connecting the elastic member and the terminal,
wherein the terminal comprises:
   a first coupler comprising a circular hole having a first diameter;
   a second coupler coupled to the circuit board; and
   a connector connecting a portion of the first coupler and a portion of the second coupler,
wherein the support comprises a suspension wire having a second diameter less than the first diameter and having a first end passing through the circular hole of the first coupler and being electrically coupled to the first coupler,
wherein a second end of the suspension wire is electrically connected to the elastic member,
wherein the connector comprises a curved portion or a bent portion,
wherein a lower surface of the second coupler is positioned higher than an upper surface of the first coupler, and
wherein a width of the connector is less than a width of the first coupler.

25. A lens moving apparatus comprising:
a base;
a circuit board disposed on the base and comprising a pad portion;
a housing disposed to be spaced apart from the base;
a bobbin disposed in the housing;
a first coil disposed on the bobbin;
a magnet disposed on the housing and comprising a first coupler comprising a circular hole with a first diameter and a second coupler coupled to the pad portion of the circuit board;
a solder connecting the pad portion of the circuit board and the second coupler;
an elastic member coupled both to the bobbin and to the housing;
a terminal disposed on the base; and
a support connecting the elastic member and the terminal,
wherein the support comprises a suspension wire having a second diameter less than the first diameter and having a first end passing through the circular hole of the first coupler and being electrically coupled to the first coupler,
wherein a second end of the suspension wire is electrically connected to the elastic member,
wherein a lower surface of the second coupler is positioned higher than an upper surface of the first coupler, and
wherein an area of the second coupler is smaller than an area of the first coupler.

26. The lens moving apparatus according to claim 25, wherein a width of the connector is less than a width of the first coupler.

* * * * *